United States Patent
Onchuck et al.

(10) Patent No.: US 10,246,888 B2
(45) Date of Patent: Apr. 2, 2019

(54) METHOD AND APPARATUS FOR CONSTRUCTION LAYOUT

(71) Applicants: Gerald Dean Onchuck, Mooreton, ND (US); Arnel William Onchuck, Wahpeton, ND (US)

(72) Inventors: Gerald Dean Onchuck, Mooreton, ND (US); Arnel William Onchuck, Wahpeton, ND (US)

( * ) Notice: Subject to any disclaimer, the term of this patent is extended or adjusted under 35 U.S.C. 154(b) by 388 days.

(21) Appl. No.: 15/000,702

(22) Filed: Jan. 19, 2016

(65) Prior Publication Data
US 2016/0208502 A1    Jul. 21, 2016

Related U.S. Application Data

(60) Provisional application No. 62/105,020, filed on Jan. 19, 2015.

(51) Int. Cl.
*G01C 15/02* (2006.01)
*E04G 21/18* (2006.01)

(52) U.S. Cl.
CPC ......... *E04G 21/1841* (2013.01); *G01C 15/02* (2013.01)

(58) Field of Classification Search
CPC .. E04G 21/1841; G01C 15/00; G01C 15/002; G01C 15/02; G01C 21/20; G01C 22/006; G06F 3/011

USPC .......................................................... 702/150
See application file for complete search history.

(56) References Cited

U.S. PATENT DOCUMENTS

| | | | |
|---|---|---|---|
| 5,091,869 A * | 2/1992 | Ingram | G01C 15/00 702/155 |
| 5,255,441 A | 10/1993 | Burgess et al. | |
| 5,337,149 A * | 8/1994 | Kozah | G01C 15/002 356/139.03 |
| 6,384,823 B1 * | 5/2002 | Donoghue | G01C 15/002 715/848 |
| 2003/0050878 A1 * | 3/2003 | Rappaport | G06Q 30/04 705/34 |

* cited by examiner

*Primary Examiner* — Matthew E. Gordon
(74) *Attorney, Agent, or Firm* — Kinney & Lange, P.A.

(57) ABSTRACT

A floor plan is fit to a foundation and points are defined at relevant locations on the floor plan. The points are defined based on the location of the point and the features associated with the point. Walls are laid out at full scale on a construction site based on the floor plan. The walls are located by locating the positions of the defined points, and the defined points are located with a point marker base, prism assembly, and electronic surveying equipment. The prism assembly is mounted to the point marker base, and the point marker base provides a reference point from which an offset distance to the defined point is determined. A rotatable measuring instrument is secured to the point marker base and measures the offset distance. Wall lines are located based on the location of the defined point.

25 Claims, 21 Drawing Sheets

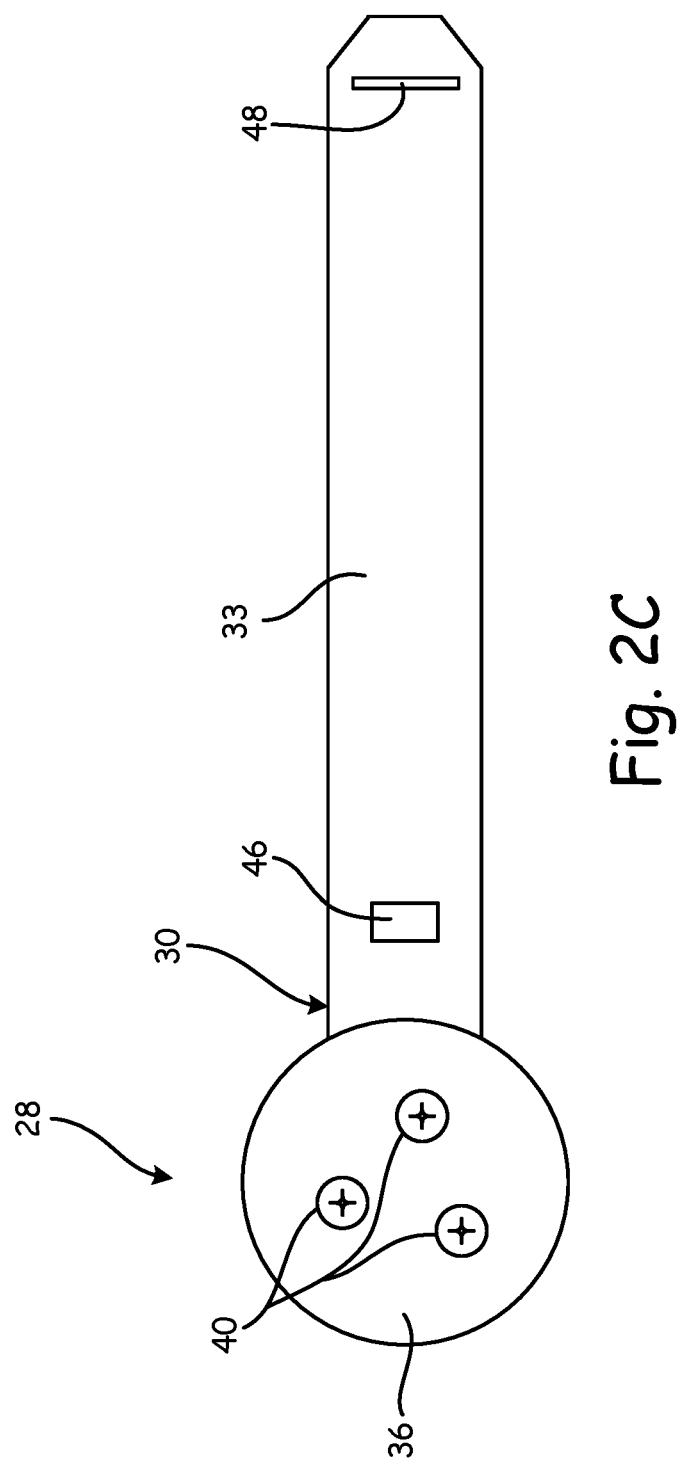

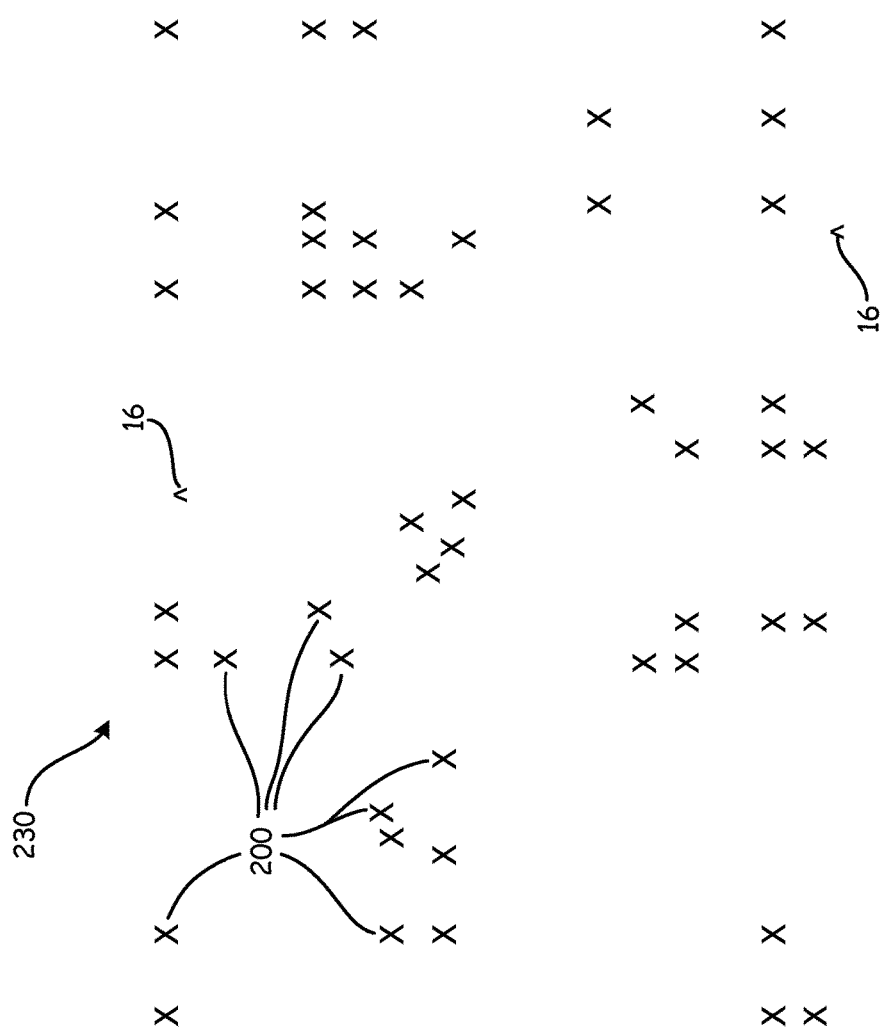

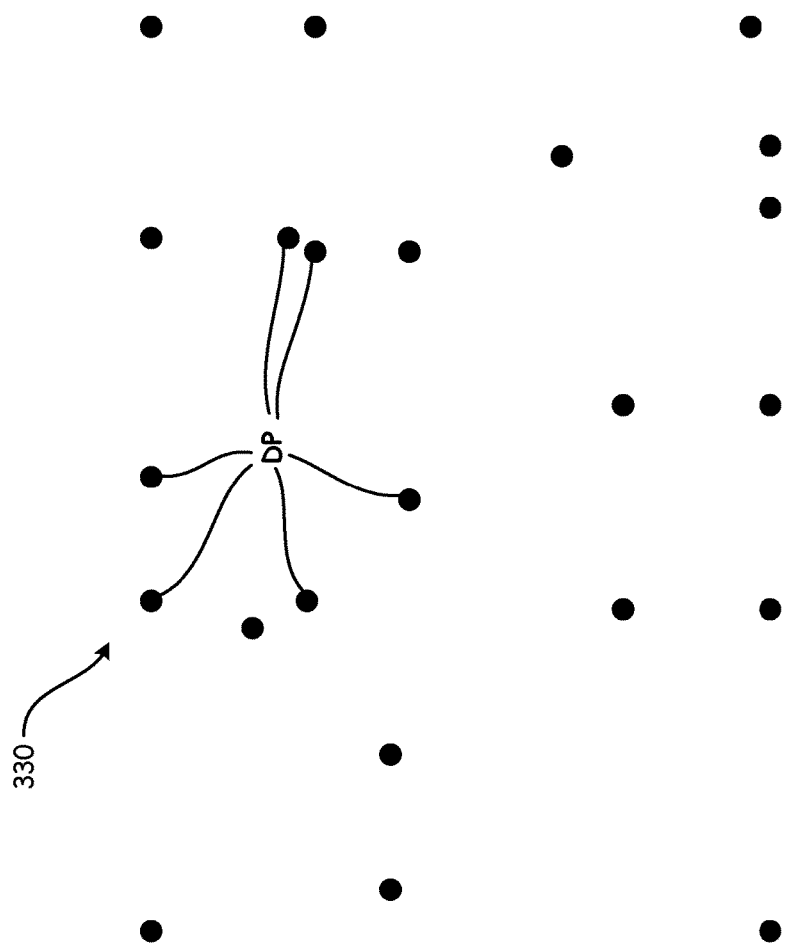

METHOD AND APPARATUS FOR CONSTRUCTION LAYOUT

CROSS-REFERENCE TO RELATED APPLICATION(S)

This application claims priority to U.S. Provisional Application No. 62/105,020 filed Jan. 19, 2015, and entitled "METHOD AND APPARATUS FOR CONSTRUCTION LAYOUT" the disclosure of which is hereby incorporated in its entirety.

BACKGROUND

The present invention relates generally to the field of construction layout. In particular, the present invention relates to a method for locating wall lines during construction layout, and an apparatus for use in locating the wall lines.

When a new building is constructed, a floor plan is generated electronically with the use of a drafting program. The floor plan is a scaled, sectioned, top view of the building as it will appear on the site. Typically, the floor plan includes predetermined defined lines and other relevant details defining the walls that are to be located on the site, the lines and relevant details assist a contractor in laying out the building at full size on the construction site. The process of reading the plan details and converting the defined lines from the scaled floor plan to full size on the construction site is typically referred to as construction layout.

During construction layout, wall lines must be accurately located on the site. One method involves the use of a builder's level and a tape measure and a blueprint plan with dimension lines and detail references between lines to establish the lines on the site. During construction layout, a line is chosen that will be used as the reference line for the layout of other wall lines. Because the scaled relationship between wall lines is known from the floor plan, the full-scale relationship between the wall lines is also known. A second wall line is marked by measuring a known distance in a known direction from the reference line. Subsequent wall lines are established by marking points near each end of a wall line, each mark is then connected to a mark on an opposite end of a wall line, creating a fully defined wall line in full scale between the two marks. Laying out marks for lines by reading and transferring references from blueprints with handheld tools is a time consuming practice that requires a significant amount of expertise and typically requires at least two people.

Electronic surveying equipment, such as a total station, provides an attractive alternative to manual construction layout. A total station is an electronic transit and electronic distance measuring device that can accurately determine angles and distances from the total station. A transit is a precision instrument used for measuring angles in the horizontal and vertical planes. To determine distance, a laser is beamed from the total station to a reflective prism, mounted near the top of a prism stake, and the electronic surveying equipment measures the amount of time the light takes to reflect back to the total station from the prism. When utilizing a prism stake, the prism stake has a point at its base, and the point is set at a particular location to allow the total station to provide an accurate reading. The prism may also be manually mounted and leveled on a tripod or other similar device. To ensure an accurate reading, the prism must be completely level above the point that is being located, because any lean from the vertical will provide an inaccurate reading due to the prism being slightly offset from the point that is being marked. Alternative, a laser-light may be projected downward from a tripod that the prism is mounted on, and the laser-light will indicate the point over which the prism is located. The total station conveys the coordinates of the point to the user via a handheld unit is also used to control the total station.

In construction layout utilizing a total station, the floor plan must be converted into defined points and the defined points uploaded to the total station. On the construction site, the user selects a predetermined point associated with the wall that the user is attempting to mark and communicates this information to the total station. The user levels the prism stake at a point on the construction site, which point will serve as a reference point for the total station. The total station locates the prism and informs the user, almost instantly on the handheld unit, of the distance from the prism stake to the selected defined point that the user created and is marking. For example, the total station will inform the user that the defined point is located 15 inches west and 7 inches north of the prism. The user then takes that information and moves the prism stake from the reference point established by the prism to the defined point, as indicated by the total station, and continues this process until the point is accurately located and marked.

Even when using a total station, construction layout is a time consuming process requiring a significant amount of expertise. Initially, the floor plan is converted into points, which may consist of hundreds or thousands of points generated on and defining the floor plan. The points created are generally surveying points, which indicate a precise location on the site. Each point is located and marked using a prism mounted on a rod or tripod. The prism must be sufficiently level whenever the user attempts to mark the point, to ensure that the distance calculated from the total station to the prism accurately conveys the distance from the total station to the point.

While hundreds or thousands of points are generated, each point has a general description, for example "100" for the one hundredth point. Such a general description fails to convey the necessary information needed to perform construction layout, such as the location of and orientation of walls. Additionally, each of the hundreds or thousands of points may have differing purposes depending on the construction layout, which leads to a loss of efficiency experienced by the user. The hundreds or thousands of points may represent a location of the centerline of a wall, the edge of a wall, the intersection between walls, or another relevant location. Yet the data provided by current plan converting methods for the surveying equipment merely gathers information for locating actual surveying points and fails to provide and communicate the purpose or features of that point. Thus, there exists a need for an improved method of construction layout. There also exists a need for an apparatus for use with the method of construction layout.

SUMMARY

According to one aspect of the present disclosure, an apparatus for marking points during construction layout includes a point marker base, a measuring instrument rotatably secured to the point marker base, and a prism assembly mounted to and extending vertically from the point marker base.

According to another aspect of the present disclosure, a method of construction layout includes defining points in a floor plan, uploading the defined points to an electronic surveying instrument, selecting a first defined point to be located, locating a point marker base at a reference point, determining an offset distance between the first defined point and the reference point, and determining locations of wall lines based on the offset distance between the first defined point and the reference point.

According to yet another aspect of the present disclosure, a method of converting a floor plan for construction layout includes generating, with a processor of a computer, a best fit of a floor plan on a building footprint, and storing the floor plan and building footprint in a memory of the computer, locating seed points at selected locations within the floor plan using a user interface, and locating defined points at selected locations within the floor plan, the selected locations including at least one of an end of a wall, an intersection of a plurality of walls, a control point.

BRIEF DESCRIPTION OF THE DRAWINGS

FIG. 2C is a bottom view of a point marker base with a spinning ruler according to an embodiment of the present invention.

FIG. 9B is a top view of a construction site after construction layout.

FIG. 9C is a top view of a construction site with defined points marked.

DETAILED DESCRIPTION

Figure 1A:
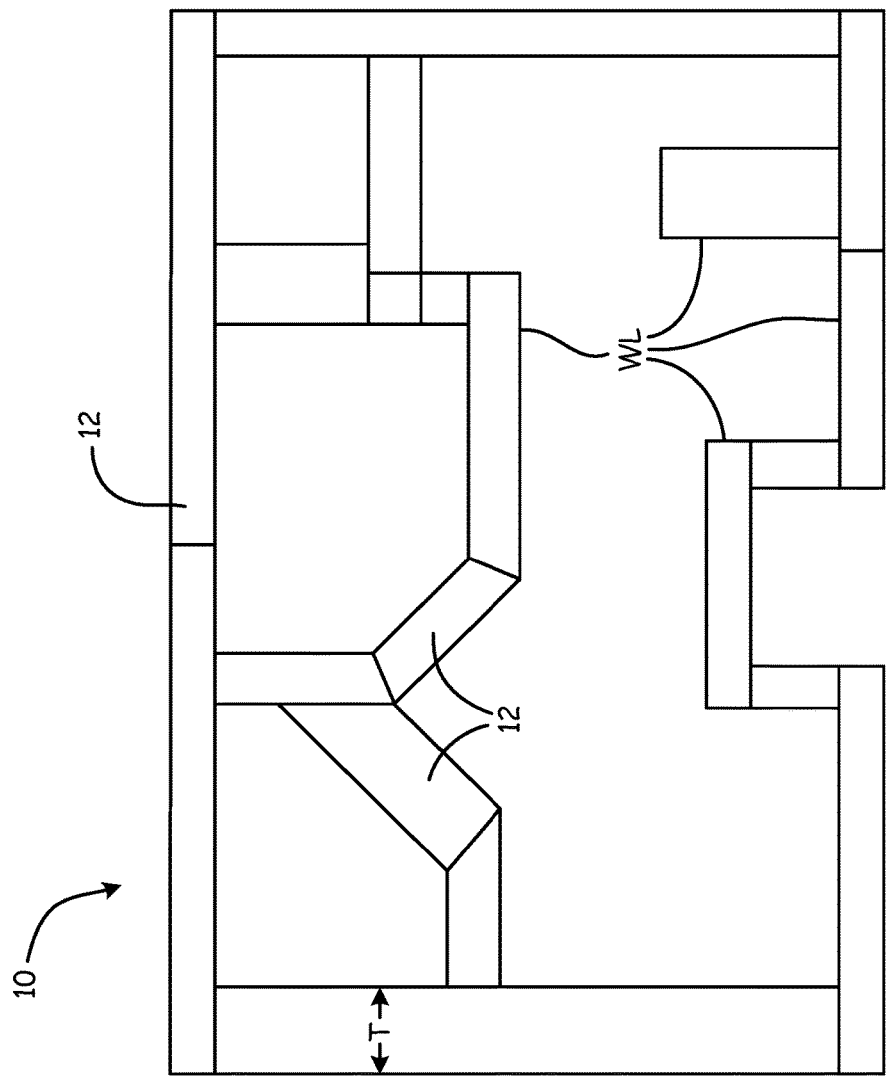
FIG. 1A is a top view of a floor plan.
Figure 1B:
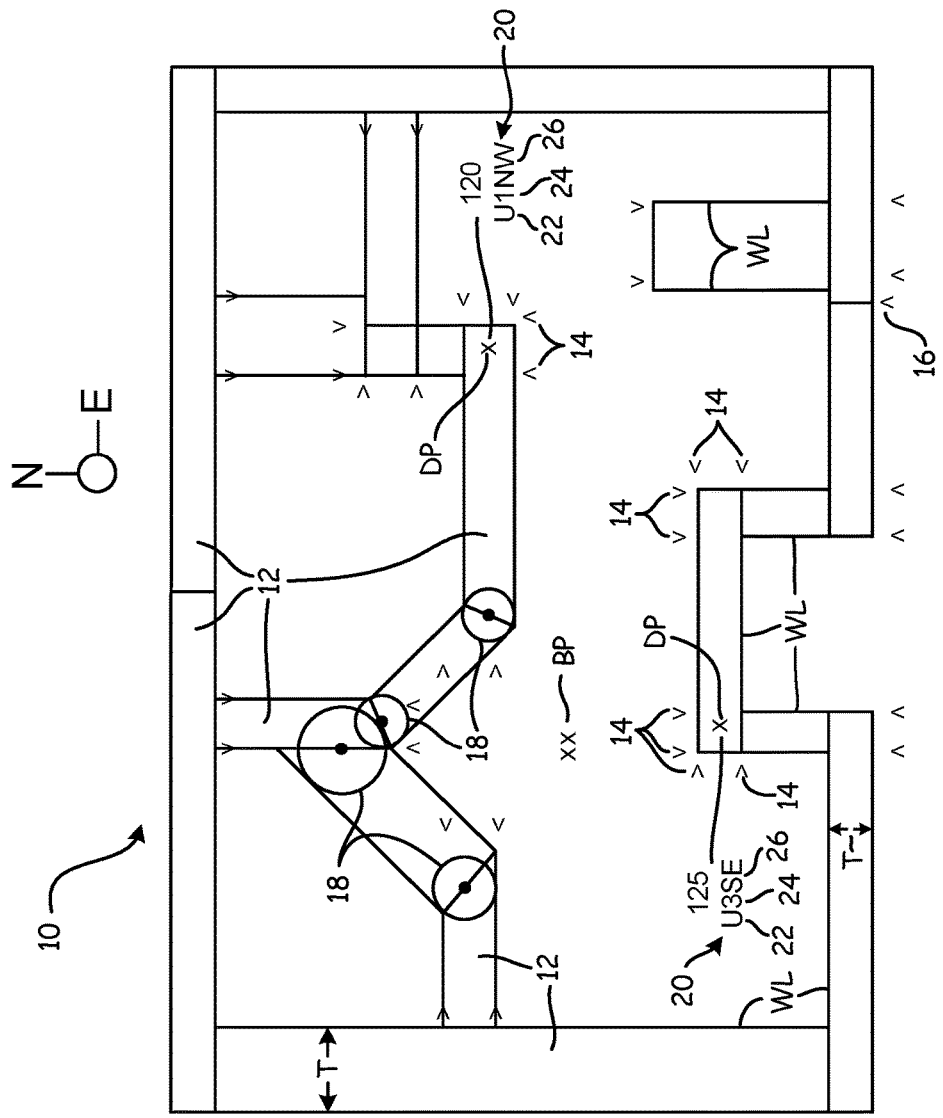
FIG. 1B is a top view of a floor plan with a relative orientation.

FIG. 1A is a top view of a floor plan 10. FIG. 1B is a top view of floor plan 10 showing a relative orientation for floor plan 10. Floor plan 10 includes lines and features defining walls 12, wall lines WL, defined points DP, backsight points BP, orienting arrows 14, control marks 16, and angled wall marks 18. Each wall 12 has a thickness T. Wall lines WL define the edges of walls 12. Defined points DP include point numbers and descriptions 20. Descriptions 20 include wall designation 22, unit number 24, and label 26.

Floor plan 10 is a scaled view of a building that shows the relationship between rooms, spaces, and other physical features of the building. When floor plan 10 is generated, defined points DP are generated at relevant locations, such as intersections between walls 12. At the time defined points DP are generated, defined points DP have a general description, usually consisting of a symbol, such as sequential numbers or letters, generated by the drafting program. For example, if there are thirty points, the drafting system may generate a general description for the twenty-second point that reads "22."

Floor plan 10 must be oriented on a construction site during construction layout. Floor plan 10 is oriented according to a relative directional orientation, which has been selected for the site. Relative north and east do not necessarily have to align with true north and east.

Orienting arrows 14 are aligned with each wall line WL to indicate the direction that wall line WL extends relative to defined point DP. Additionally, each pair of orienting arrows 14 pointing in a first direction have an associated pair of orienting arrows 14 pointing towards and associated with the first pair of orienting arrows 14. In this way, it is known that wall 12 is defined by wall lines WL extending between the first pair of orienting arrows 14 and the second pair of orienting arrows 14. Backsight points BP are located at any desired position within the interior of the building. Backsight points BP are preferably arranged in pairs and are configured to project vertically through all of the floors of the building. As such, backsight points BP provide the user with a locating reference point regardless of the floor being laid out. Backsight points BP are preferably arranged in pairs so at least one backsight point BP may be utilized if the other backsight point BP is obstructed, such as by a floor joist. In fact, there are preferably two pairs of backsight points BP to ensure that a reference is available for all floors.

Control marks 16 indicate where the end of a prefabricated wall segment should fall on the construction site. Control marks 16 are generally marked on the construction site where wall 12 is long enough to require the joining of multiple prefabricated wall segments to construct the wall at full size. Utilizing control marks 16 allows the builder to ensure that walls 12 are being installed at the correct locations and that the joint between two prefabricated wall segments falls at the correct location on the site. In this way, the use of control marks 16 ensures that the building will not overrun its foundation due to excess length inadvertently gained during construction.

Angled wall mark 18 indicates the ends of angled walls. Angled wall mark 18 is preferably a circular mark surrounding a defined point DP associated with an angled wall. The diameter of angled wall mark 18 is determined by the thickness of the wall associated with angled wall mark 18, as wall lines WL are tangential to angled wall mark 18.

While angled wall mark 18 is shown as a circular mark, it is understood that angled wall mark 18 may be any suitable mark for indicating the ends of angled walls. Wall lines WL extend tangentially between associated angled wall marks 18.

During construction layout, the relative directional orientation of floor plan 10 is established for the construction site. As such, "north" as indicated on the floor plan 10 will not necessarily be true north. Once defined points DP are created for floor plan 10, description 20 is added for each defined point DP. In this way, each defined point DP has a wall designation 22, unit number 24, and label 26. However, a single floor plan 10 may have several relative directional orientations for the same building. Where there are several relative directional orientations for the same project, each defined point DP will be associated with one of the orientations, and the description 20 for that defined point DP will correspond to that associated orientation.

Wall designation 22 indicates whether wall 12 on which defined point DP is located is an exterior wall, a corridor wall, or a unit wall. Wall designation "E" indicates that wall 12 on which defined point DP is located is an exterior wall, which is a wall 12 that separates an interior of the building from an exterior of the building. Wall designation "C" indicates that wall 12 on which defined point DP is located is a corridor wall, which is a wall 12 that defines a corridor within the building, such as a hallway. Wall designation "U" indicates that wall 12 on which defined point DP is located is a unit wall, which is a wall 12 that is located within the interior of a unit. While wall designation 22 has been described as including the designations E, C, and U to distinguish between various wall types, it is understood that wall designation 22 could include any suitable descriptor for distinguishing among various wall types.

Unit number 24 informs of which numbered unit defined point DP is located in or adjacent to. Unit number 24 may indicate various apartments, various offices, different directional orientations within a single building or unit, or any other suitable grouping. Unit numbers 24 may filter and sort points associated with specific areas of floor plan 10, and unit numbers 24 may relate to any type of wall.

In the present embodiment, label 26 provides the directional orientation of orienting arrows 14, the thickness T of wall 12, whether wall 12 is oriented in accordance with a relative directional orientation or angled, and/or whether defined point DP is a control mark 16. Label 26 may also indicate that defined point DP is located at a control mark, indicated with "C." Where label 26 includes "C," indicating a control mark 16, defined point DP is located at an intersection between adjacent partitions. Moreover, where label 26 includes "ANGLED," then label 26 indicates wall 12 is not oriented along relative north, south, east, or west. Additionally, where label 26 includes "ANGLED," it is known that angled wall mark 18 will surround defined point DP with that label 26, as angled wall mark 18 indicates the location of the end of an angled wall. While label 26 has been described as including various symbols and phrases, such as "E," "C," and "ANGLED," it is understood that label 26 may include any suitable symbol to convey the information necessary to accurately lay out wall 12.

Specifically regarding corridor walls and exterior walls, label 26 indicates whether defined point DP is associated with either a wall projecting into the building, indicated by relative direction with regard to the defined point DP, or a control mark, indicated with "C." For defined points DP located on an exterior wall or a corridor wall, unit number 24 indicates the unit that the wall will project into from defined point DP. For unit walls, unit number 24 indicates the unit that the wall is located within. Like label 26 for a designated point DP on an exterior wall or a corridor wall, label 26 for a designated point DP associated with a unit wall indicates relative directional orientation for the wall lines, such as north, south, east, or west.

Regarding thickness T of wall 12, when label 26 does not include a numeral, then wall 12 is assumed to be a standard 2×4 wall that is 3.5 inches wide, because a standard 2×4 has a width of 3.5 inches. If label 26 indicates "6," then the wall is a 2×6 wall, which a width of 5.5 inches. Similarly, a label 26 including "8," "10," or "12" indicates that the wall is a 2×8 wall with a width of 7.25 inches, a 2×10 wall with a width of 9.25 inches, or a 2×12 wall with a width of 11.25 inches, respectively. For example, if defined point DP has a label "P6," then that defined point DP is associated with a 2×6 wall. Because a standard 2×6 wall has a width of 5.5 inches, a wall with a label 26 including "6" is 5.5 inches wide.

As can be seen in FIG. 1B, orienting arrows 14 inform a site marker of the direction that wall lines WL extend to outline walls 12. Orienting arrows 14 point relative north, south, east, or west depending upon the label 26 associated with a specific defined point DP. Where label 26 indicates "N," then orienting arrow 16 points relative north with regard to that defined point DP. Similarly, where label 26 includes "S," then orienting arrows 16 point relative south, indicating that wall lines WL extend relative south from defined point DP. Where label 26 indicates "W," then orienting arrows 14 indicate relative west with regard to that defined point DP. Similarly, where label 26 includes "E," then orienting arrows 14 point relative east, indicating that wall lines WL extend to the relative east of defined point DP.

Figure 1C:
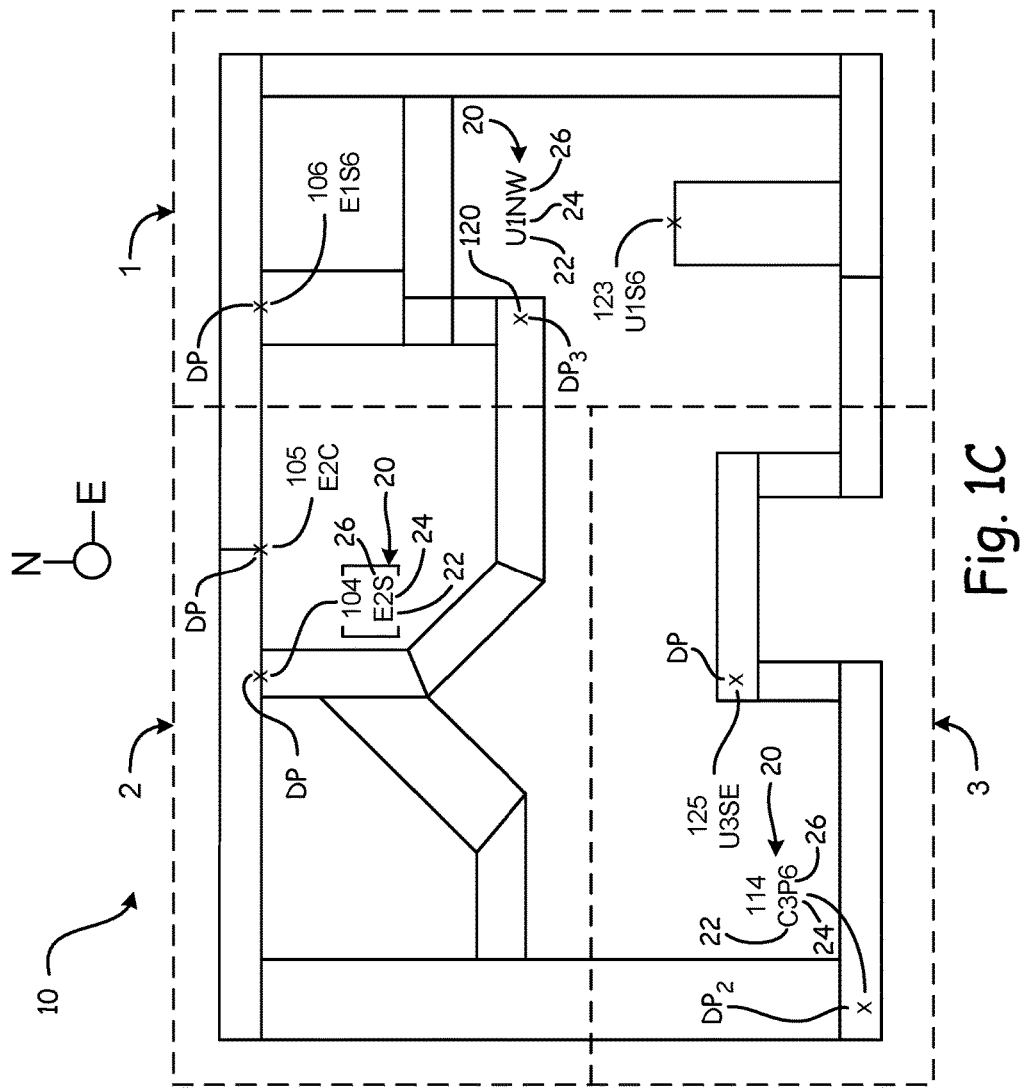
FIG. 1C is a top view of a floor plan divided into unit numbers.

FIG. 1C is a top view of floor plan 10 divided into unit 1, unit 2, and unit 3. Unit 1 includes walls 12, wall lines WL, defined points DP, orienting arrows 14, and control mark 16. Unit 2 includes walls 12, wall lines WL, defined points DP, and orienting arrows 14. Similarly, unit 3 includes walls 12, wall lines WL, defined points DP, and orienting arrows 14. Each wall has a thickness T, and wall lines WL define the edges of each wall 12. Defined points DP include point numbers and descriptions 20. Descriptions 20 include wall designation 22, unit number 24, and label 26.

Unit number 24 informs of which numbered unit defined point DP is either adjacent to or falls within. Floor plan 10 may be divided into various units as desired. In FIG. 1C, floor plan 10 is divided into three units, unit 1, unit 2, and unit 3. Thus, the unit number for a defined point DP adjacent to or within unit 1 reads "1," the unit number for a defined point DP adjacent to or within unit 2 reads "2," and the unit number for a defined point DP adjacent to or within unit 3 reads "3." While floor plan 10 is shown as divided into three units, it is understood that floor plan 10 may be divided into units that indicate various apartments, various offices, different directional orientations within a single unit, or any other suitable grouping.

Figure 1D:
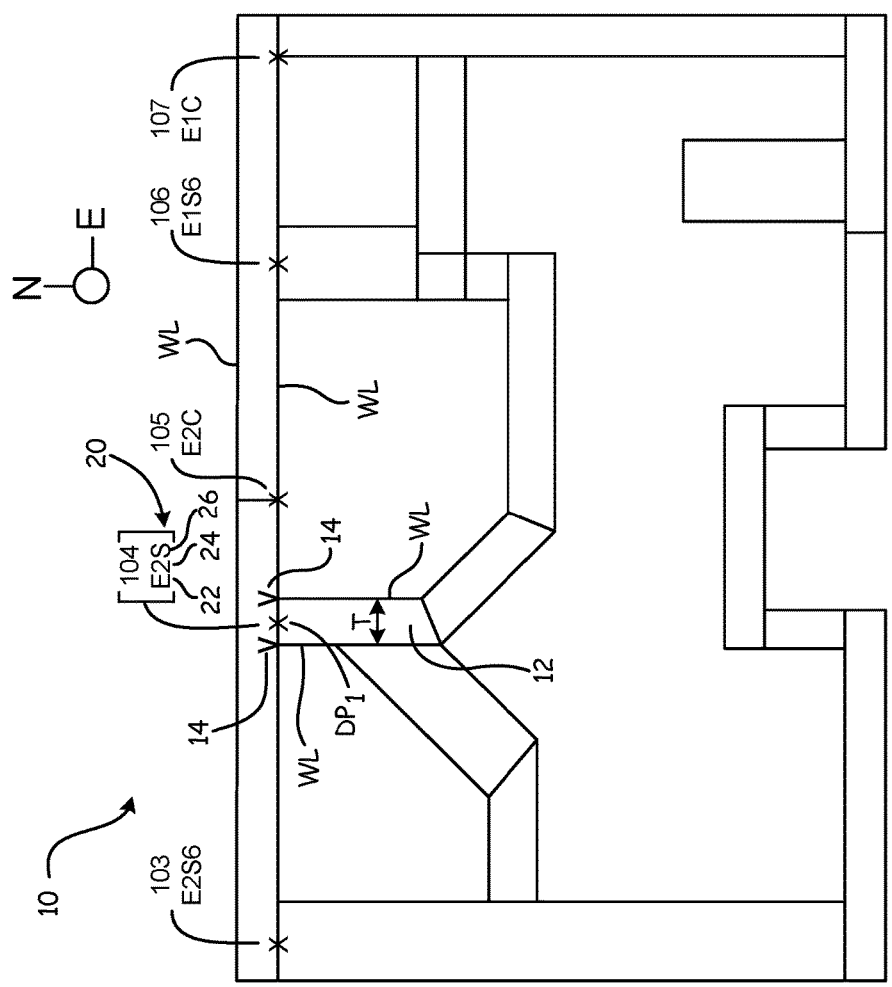
FIG. 1D is a top view of a floor plan with exterior defined points and descriptions marked.

FIG. 1D is a top view of floor plan 10 with defined points DP shown along an exterior wall. Regarding defined points DP for exterior walls, defined point $DP_1$ will be discussed in more detail. Floor plan 10 includes lines and features defining walls 12, wall lines WL, defined points DP, orienting arrows 14, and control marks 16. Each wall 12 has a thickness T. Wall lines WL define the edges of walls 12. Defined points DP include point numbers and description 20. Descriptions 20 each include wall designation 22, unit number 24, and label 26.

Defined point $DP_1$ has a description reading "E2S." Wall designation 22 for defined point $DP_1$ is "E," which indicates that the wall that defined point $DP_1$ is located on is an exterior wall, a wall that separates an interior of the building from an exterior of the building. Defined point DP with wall designation "E" is preferably located on the interior wall line of an exterior wall. Thus, wall designation "E" indicates that defined point $DP_1$ lies on the interior wall line WL of an exterior wall.

Unit number of "2" indicates that defined point $DP_1$ is adjacent to unit 2. It is known that defined point $DP_1$ is adjacent to unit 2 because defined point $DP_1$ is associated with an exterior wall, and defined points for exterior walls are adjacent to units, not within the units. Label 26 for defined point $DP_1$ reads "S," which indicates that the wall extending from defined point $DP_1$ and into unit 2 extends to the relative south of defined point $DP_1$.

While label 26 for defined point $DP_1$ reads "S," indicating that a wall extends into the unit to the relative south of defined point $DP_1$, one of skill in the art will recognize that label 26 may include any suitable designator for informing the user of the relative orientation for the wall extending from defined point $DP_1$. For example, label 26 may include a designator such as "P" to indicate that the point is a partition point, and that the wall extending from defined point $DP_1$ extends into the unit. In such a case, unit number 24 provides sufficient information regarding the orientation of any wall projecting from that defined point DP for the wall to be accurately oriented. In such a case, description 20 of exterior walls does not require a directional orientation because any partition intersecting an exterior wall will project into the associated unit.

The label for defined point $DP_1$ includes "S," which informs the user that defined point $DP_1$ extends to the relative south of defined point $DP_1$. As such, the partition wall associated with defined point $DP_1$ projects into unit 2, located to the relative south of defined point $DP_1$, from the interior-side wall line that defined point $DP_1$ is located on. Label 26 of defined point $DP_1$ does not include a numeral, which indicates that the wall extending into unit 2 from defined point $DP_1$ is a standard 2×4 wall with a width of 3.5 inches, because standard 2×4 walls have actual widths of 3.5 inches. Thus, wall lines WL of the wall extending into unit 2 from defined point $DP_1$ are located 1.75 inches to either side of defined point $DP_1$.

Therefore, description 20 for defined point $DP_1$ provides sufficient information about defined point $DP_1$ to know that defined point $DP_1$ is located on the interior wall line WL of an exterior wall, that defined point $DP_1$ is adjacent to unit 2, that a wall extends to the relative south and into unit 2 from defined point $DP_1$, and that wall lines WL of the wall extending into unit 2 are located 1.75 inches to either side of defined point $DP_1$.

Figure 1E:
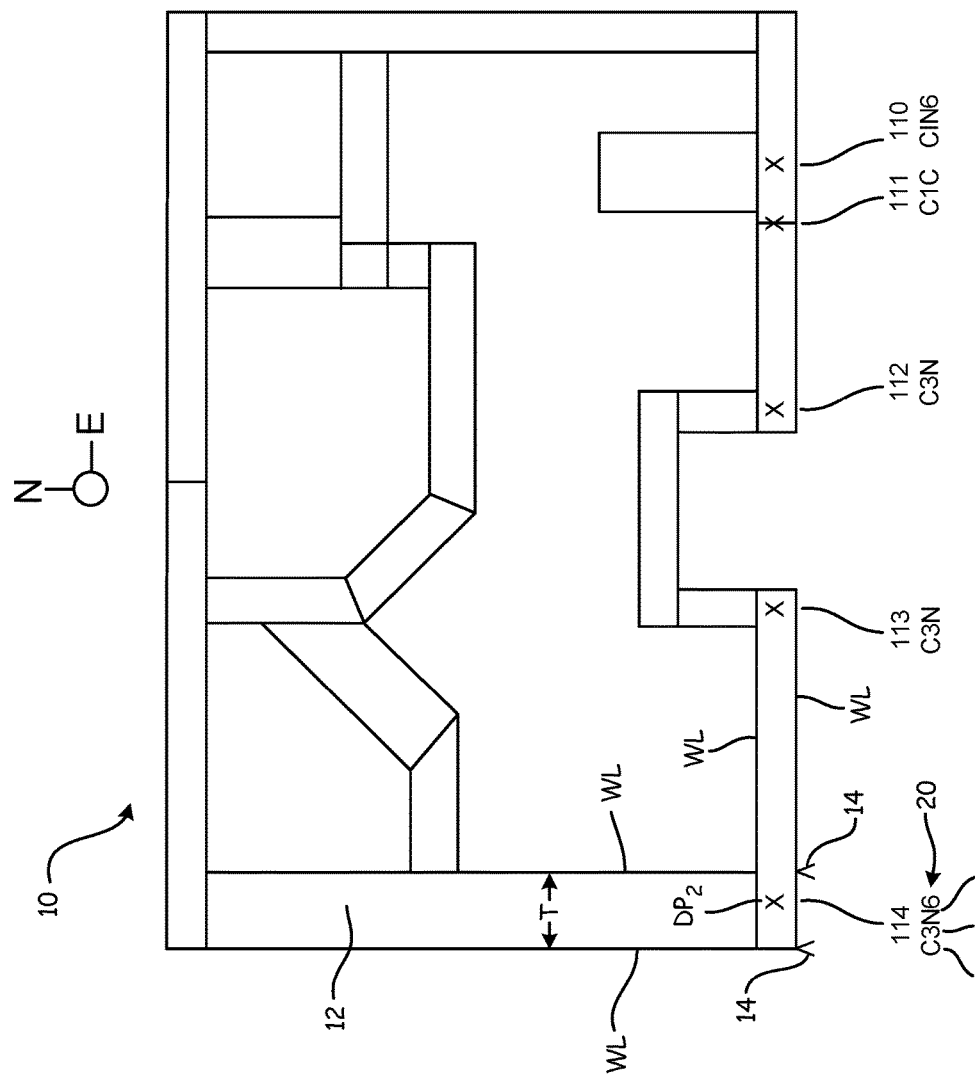
FIG. 1E is a top view of a floor plan with corridor defined points and descriptions marked.

FIG. 1E is a top view of floor plan 10 with defined points DP shown along a corridor wall. Regarding defined points DP for corridor walls, defined point $DP_2$ will be discussed in more detail. Floor plan 10 includes lines and features defining walls 12, wall lines WL, defined points DP, orienting arrows 14, and control marks 16. Each wall 12 has a thickness T. Wall lines WL define the edges of walls 12. Defined points DP include point numbers and description 20. Descriptions 20 each include wall designation 22, unit number 24, and label 26.

Defined point $DP_2$ has a description reading "C3N6." Wall designation 22 for defined point $DP_2$ is "C," and wall designation "C" indicates that wall 12 on which defined point DP is located is a corridor wall. A corridor wall is a wall 12 that defines a corridor within the building, such as a hallway. Defined point DP with wall designation "C" is preferably located on the midline of the corridor wall. Thus, wall designation "C" indicates that defined point $DP_2$ lies in the middle of a corridor wall such that wall lines WL will be located on either side of defined point $DP_2$. Corridor walls are not necessarily present in any particular building. When corridor walls are present, however, the corridor walls are generally similar to exterior walls, except the corridor walls are interior to the building and run as a pair. Sequentially, corridor walls are usually the second walls located during construction layout, after exterior walls.

Unit number 24 for defined point $DP_2$ is "3," which indicates that defined point $DP_2$ is adjacent to unit 3. Label 26 for defined point $DP_2$ reads "N6," which indicates the wall extending from defined point $DP_2$ extends to the relative north of defined point $DP_2$. It is understood that label 26 may include an indicator other than a relative cardinal direction. For example, label 26 may include "P" to indicate that the defined point DP is a partition point, which is a point from which a wall projects into the associated unit, as indicated by unit number 24. Where defined point DP is located on a corridor wall and label 26 indicates that defined point is a partition point, unit number 24 provides sufficient information to locate any wall projecting from that point because partition wall will project into the unit that is adjacent to that defined point DP, as indicated by the unit number.

Label 26 of "N" indicates that defined point $DP_2$ as projects to the relative north of defined point $DP_2$. Label 26 of defined point $DP_2$ also includes "6," which indicates that the wall associated with defined point $DP_2$ is a 2×6 wall. Thus, defined point $DP_2$ indicates a wall that is 5.5 inches thick, which is the width of a standard 2×6, instead of the usual 3.5 inches. As such, it is known that the wall lines WL extending to the relative north of defined point $DP_2$ are located 2.75 inches to either side of defined point $DP_2$.

Therefore, the description 20 of defined point $DP_2$ informs that defined point $DP_2$ is located on the midline of a corridor wall, that defined points $DP_2$ is adjacent to unit 3, that defined point $DP_2$ is located on the centerline of a wall extending to the relative north of defined point $DP_2$, that the wall extending from defined point $DP_2$ extends into unit 3, and that the wall extending into unit 3 from defined point $DP_2$ has wall lines WL located 2.75 inches to either side of defined point $DP_2$.

Figure 1F:
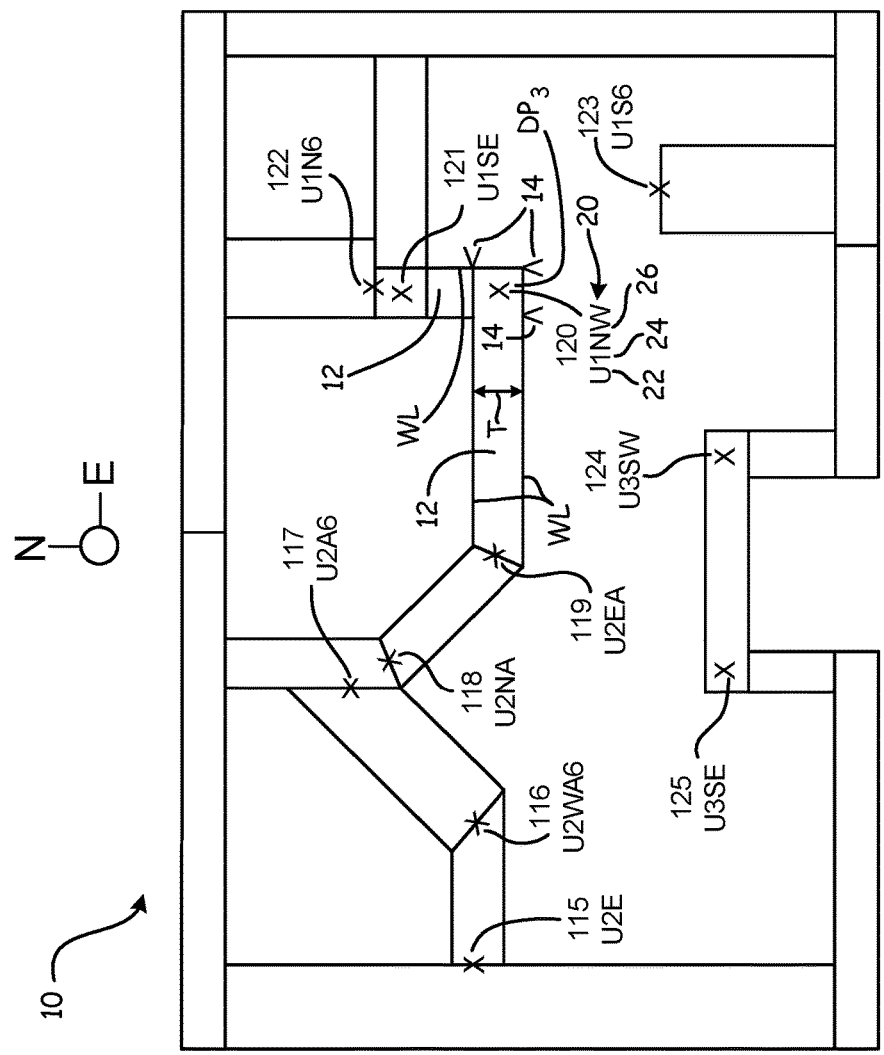
FIG. 1F is a top view of a floor plan with unit defined points and descriptions marked.

FIG. 1F is a top view of floor plan 10 with defined points DP shown within unit walls. Regarding defined points DP for unit walls, defined point $DP_3$ will be discussed in more detail. Floor plan 10 includes lines and features defining walls 12, wall lines WL, defined points DP, orienting arrows 14, and control marks 16. Each wall 12 has a thickness T. Wall lines WL define the edges of walls 12. Defined points DP include point numbers and description 20. Descriptions 20 each include wall designation 22, unit number 24, and label 26.

Defined point $DP_3$ has a description of "U1NW." Wall designation 22 for defined point $DP_3$ is "U", which indicates that the wall associated with defined point $DP_3$ is a unit wall. A unit wall is a wall 12 located within the interior of a unit. Defined point DP with wall designation "U" is preferably located on the centerline of a wall. In fact, where defined point DP is located at the intersection between two unit walls, the defined point DP will be located at the centerline of each wall at that intersection. Thus, wall designation "U" indicates that defined point $DP_3$ lies at the centerline of at least one interior wall. Unit number of "1" indicates that defined point $DP_3$ and the wall associated with defined point $DP_3$ lie within unit 1.

Label 26 for defined point $DP_3$ reads "NW." The label "N" conveys that an interior wall extends north from defined point $DP_3$. Similarly, the label reading "W" conveys that an interior wall extends west from defined point $DP_3$. Additionally, because the label of defined point $DP_3$ does not include a numeral, the walls extending to the north and the west from defined point $DP_3$ are standard 2×4 walls, which are 3.5 inches wide by convention. Thus, wall lines WL extending to the north from defined point $DP_3$ are located 1.75 inches relative east and 1.75 inches relative west of defined point $DP_3$. Orienting arrows 14 are marked on the site pointing relative north 1.75 inches east and 1.75 inches west of $DP_3$ to indicate the direction that wall lines WL extend. Label 26 also indicates that wall lines WL extend west from defined point $DP_3$. The wall lines WL extending west from defined point $DP_3$ are located 1.75 inches north and 1.75 inches south of defined point $DP_3$. Additionally, the relative west-pointing orienting arrows 14 are marked and are located 1.75 inches relative north and 1.75 inches relative south of defined point $DP_3$, which gives the location of wall lines WL on the site.

Therefore, description 20 of defined point $DP_3$ provides sufficient information to identify that defined point $DP_3$ is located at the centerline of two interior walls that intersect at defined point $DP_3$, that the interior walls are located within unit 1, and that wall lines WL of each of the two walls are located 1.75 inches away from defined point $DP_3$.

Figure 1G:
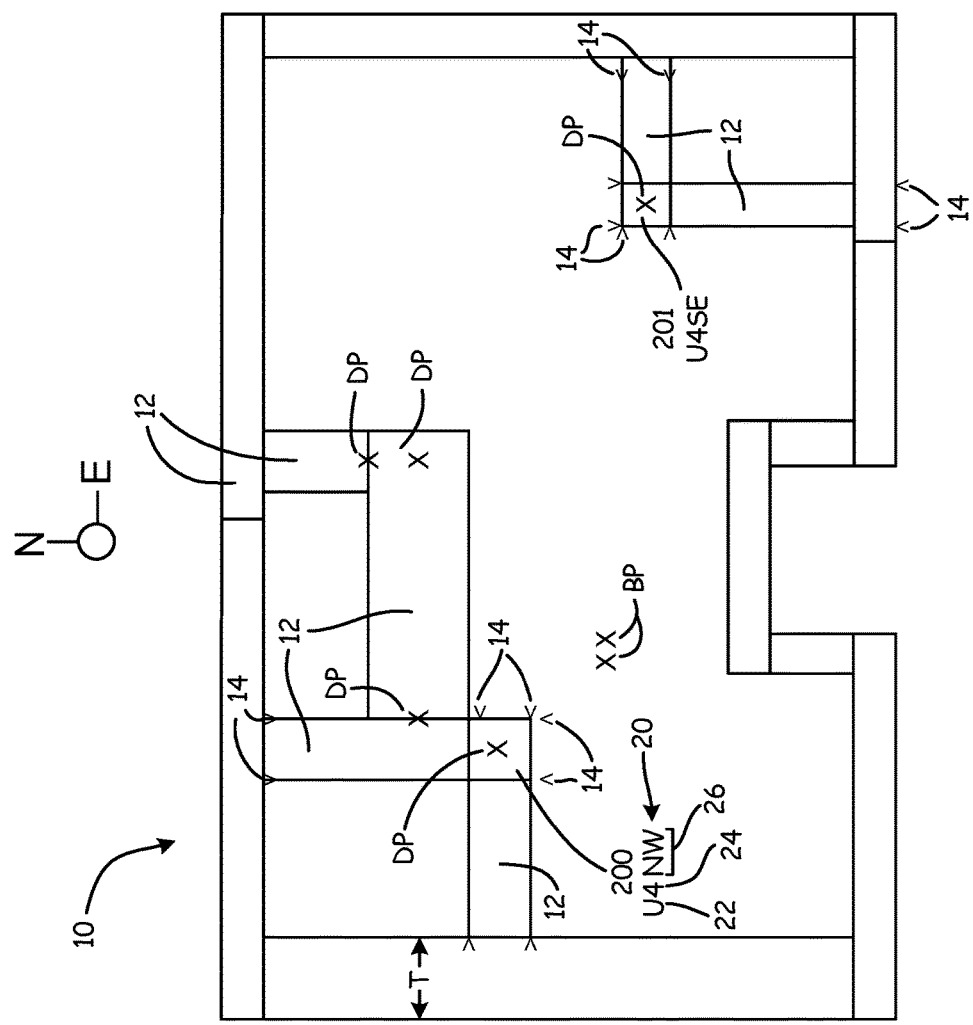
FIG. 1G is a top view of a floor plan with backsight points.

FIG. 1G is a top view of floor plan 10' with backsight points BP. Floor plan 10' is a floor plan of a unit disposed directly above floor plan 10. Floor plan 10' includes lines and features defining walls 12, wall lines WL, defined points DP, orienting arrows 14, and control marks 16. Each wall 12 has a thickness T. Wall lines WL define the edges of walls 12. Defined points DP include point numbers and descriptions 20. Descriptions 20 each include wall designation 22, unit number 24, and label 26. Backsight points BP provide a locating reference to a user.

Floor plan 10' is a floor plan of a unit disposed directly above the unit depicted in floor plan 10. For example, floor plan 10' may be a floor plan for a third floor unit while floor plan 10 may be a floor plan for a first floor unit. Backsight points BP are initially set on the lower floor, as indicated in FIG. 1B, and are configured to project vertically throughout all of the floors of the building. Backsight points BP are utilized to locate defined points DP and wall lines WL in units located above a lower floor, once the lower floor has been constructed. Backsight points BP provide absolute reference points that allow the user to easily and accurately locate defined points DP on floors disposed above previously laid out floors.

Backsight points BP are generated such that the backsight points BP carry vertically through all of the floors of the building. Once the lower floor is constructed, a laser may be shot vertically from the location of the backsight point BP on the lower floor, and a hole may be punched through the subfloor of the upper floor to provide a visual indicator of the location of the backsight point BP. It is understood, that the electronic surveying equipment may store the location of the backsight points BP along with the floor plan, such that the location of the backsight points BP is given by the electronic surveying equipment. Multiple backsight points BP are preferably generated in pairs, preferably at least 6 inches (15.24 centimeters) apart, such that a vertical line may extend unimpeded from at least one of the pair of backsight points BP to the flooring of the upper unit. As such, the pair of backsight points BP ensures that the user has a reference point regardless of the location of various supporting structures, such as floor joists, which may impede a vertical line-of-sight from a single backsight point BP.

Backsight points BP are established to work vertically through each floor of a plan in addition and separate to the BPs established with the initial building footprint survey. After the floor plan is generated and points are established, the user lays out floor plan 10 on the construction site. The walls and various features associated with floor plan 10 are constructed according to the laid out site. After building the lower floor, the next floor up must be laid out for construction. Backsight points BP establish an absolute reference from which all defined points DP on the upper floors may be located. The absolute reference provided by backsight points BP ensures that the defined points DP on each floor are located relative to the same, established point. As such, backsight points BP ensure that each floor and the associated features of each floor are laid out according to the floor plan. During layout of an upper floor, backsight points BP may be projected upward, such as with a laser, from the lower floor, and a visual indicator, such as a hole drilled through the subfloor from below, indicates the location of the backsight points BP to the user, or the location of the backsight points BP may be provided by the electronic surveying equipment. Once the backsight point BP is located on the upper floor, the user utilizes the backsight point BP as a reference point for completing the construction layout of the upper floor. For example, the user may locate defined point $DP_4$ relative to backsight points BP. Once defined point $DP_4$ is located, the user may mark the wall lines WL, orienting arrows 14, control marks 16, and various other features associated with floor plan 10' to complete the layout of the floor associated with floor plan 10'. Once the floor associated with floor plan 10' is laid out and built, the user may lay out additional upper floors utilizing the same backsight points BP, as backsight points BP are configured to project vertically through all floors of the building.

Referring generally to FIGS. 1A-1G, it is to be understood that floor plan 10, floor plan 10', description 20, and other features may be created in a software program. The software may be stored in a memory and executed with a processor. The user may interact with the software via a user interface, such as a keyboard, touchscreen, or any other suitable interface device. As such, floor plan 10, floor plan 10', description 20, defined points DP, backsight points BP, and other features may be automatically generated by the software program based on a prescribed set of rules, procedures, and defined standards contained in the software program.

Utilizing the software, each of the views described in FIGS. 1A-1G may be presented as a separate layer, or tab, of the software program. Each view may be displayed on a separate screen of the software program. For example, a first layer may include the view shown in FIG. 1A showing floor plan 10, walls 12, and wall lines WL. A second layer may then include the view shown in FIG. 1B, including floor plan 10 with lines and features defining walls 12, wall lines WL, defined points DP, backsight points BP, orienting arrows 14, control marks 16, and angled wall marks 18. Additional layers may then include views showing the division of floor plan 10 into various units, the location and description 20 of defined points DP on exterior walls, the location and description 20 of defined points DP for corridor walls, the location and description 20 of defined points DP for unit walls, and any other view useful for construction layout.

The software may automatically generate description 20 and other relevant features and information necessary for construction layout. Using exterior walls as an example, the software program may generate defined points DP on the interior wall line side of the exterior wall. The software program will generate the defined points DP either at the intersection of two prefabricated walls, making the defined point DP a control mark 18, or where a wall projects into the interior from the exterior wall. Based on the rules, procedures, and defined standards included in the software program, the software program also generates description 20 for each defined point DP on the exterior wall. As such, each defined point DP generated would include a unique description 20 containing the information necessary to allow wall lines WL to be accurately located on the construction site. Thus, where the software generates defined point DP as a control mark 18, description 20 generated by the software would include label 26 "C," or another suitable symbol to convey that defined point DP is a control mark 18. Similarly, the software would generate description 20 with label 26 "N," "S," "W," "E," or another suitable symbol, where the software generates a defined point DP or a description for defined point DP at a location where a wall projects into the building interior. While exterior walls have been described as an example, it is understood that the software program may generate and provide the necessary information for construction layout, including but not limited to floor plan 10, walls 12, wall lines WL, defined points DP, orienting arrows 14, control marks 16, angled wall marks 18, and descriptions 20.

During construction layout, the corners of a foundation of the building are initially surveyed. The locations of the building corners are inserted into the software, and the software may properly orient a floor plan, such as floor plan 10, on the foundation. A best fit is determined for the floor plan, which may be based on the dimensions of the foundation, the location of the corners of the foundation, and various other factors. The best fit may be established to meet the user's requirements, such as minimizing error around the foundation or any other desired requirement by the user. Backsight points, such as backsight points BP, are set and carry vertically through the building. Backsight points BP provide a reference to the user to ensure that the upper floors are laid out in line with the lower floors.

The software may convert a given floor plan to marks and features utilized for construction layout. A floor plan is initially created for a building and the foundation is surveyed. During surveying, defining features of the foundation, such as corners of the foundation, are located, and the survey of the foundation is loaded into the software. The software converts the floor plan into points and assigns a description 20 to each point. A fit is determined for the scaled floor plan on the foundation. For example, the fit may be the fit that minimizes error from the edge of the foundation, or may be any other desired fit. Backsight points BP are also located on the floor plan, and the backsight points BP project through each level of the proposed building. The backsight points BP project through each floor of the building to provide a known reference point for the user.

The software may include a seed point generator for providing rules to the software to ensure an accurate conversion of the floor plan for use in construction layout. The seed points may be located on the floor plan by the user to provide rules to the software to accurately generate the defined points and descriptions of the floor plan. The seed points instruct the software to look at certain portions of the floor plan in a certain manner. For example, seed points may be placed around the perimeter of the building, and those seed points may include an assignment designating that seed point as an exterior point and instructing the software on how to make identifications of any exterior walls extending from that point. The software follows the prescribed rules contained in the assignment to define the floor plan in full scale. Once the software has identified the wall lines, the user may verify the accuracy of the floor plan and wall lines. With the accuracy of the wall lines verified, the software inserts defined points DP and descriptions 20 for each defined point DP.

Figure 2A:
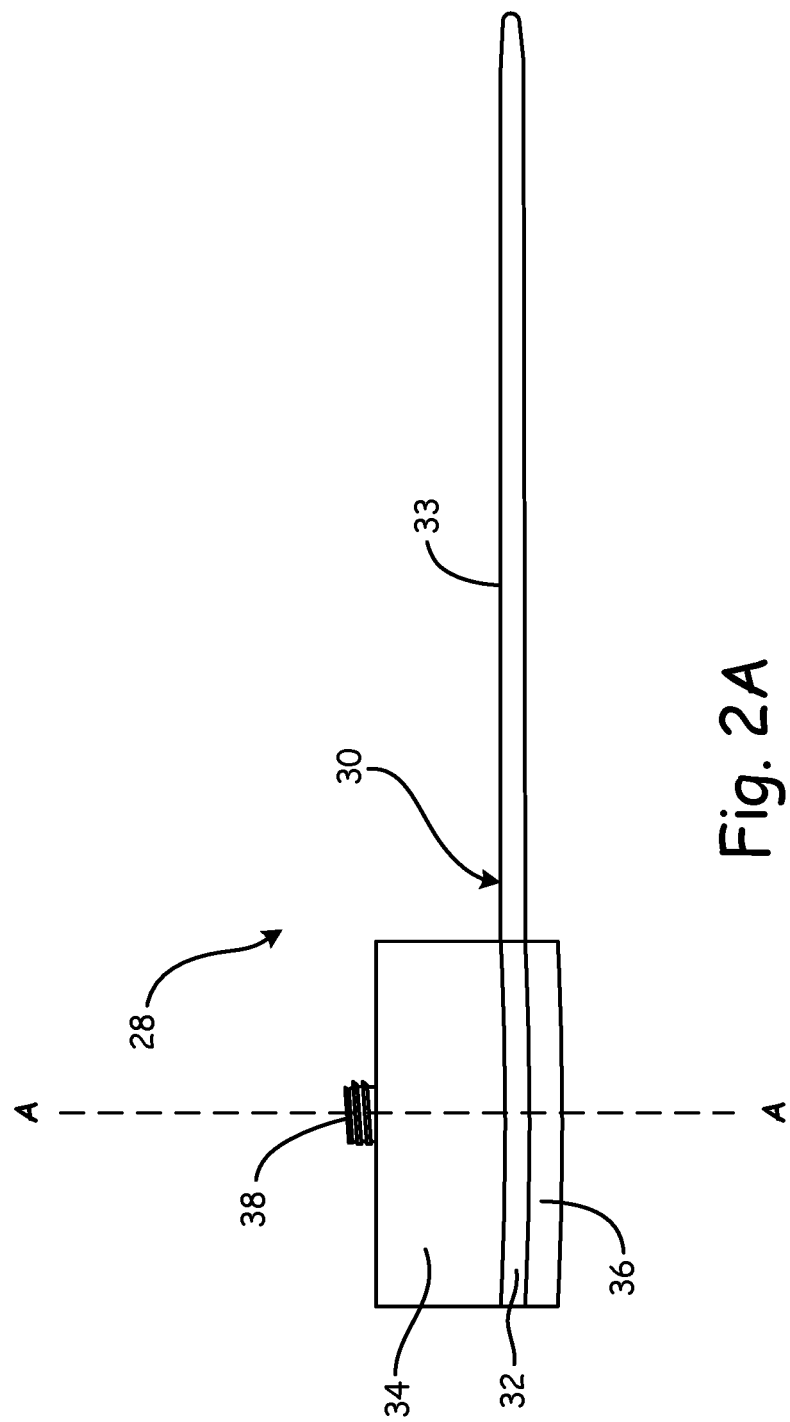
FIG. 2A is a side view of a point marker base with a spinning ruler according to an embodiment of the present invention.
Figure 2B:
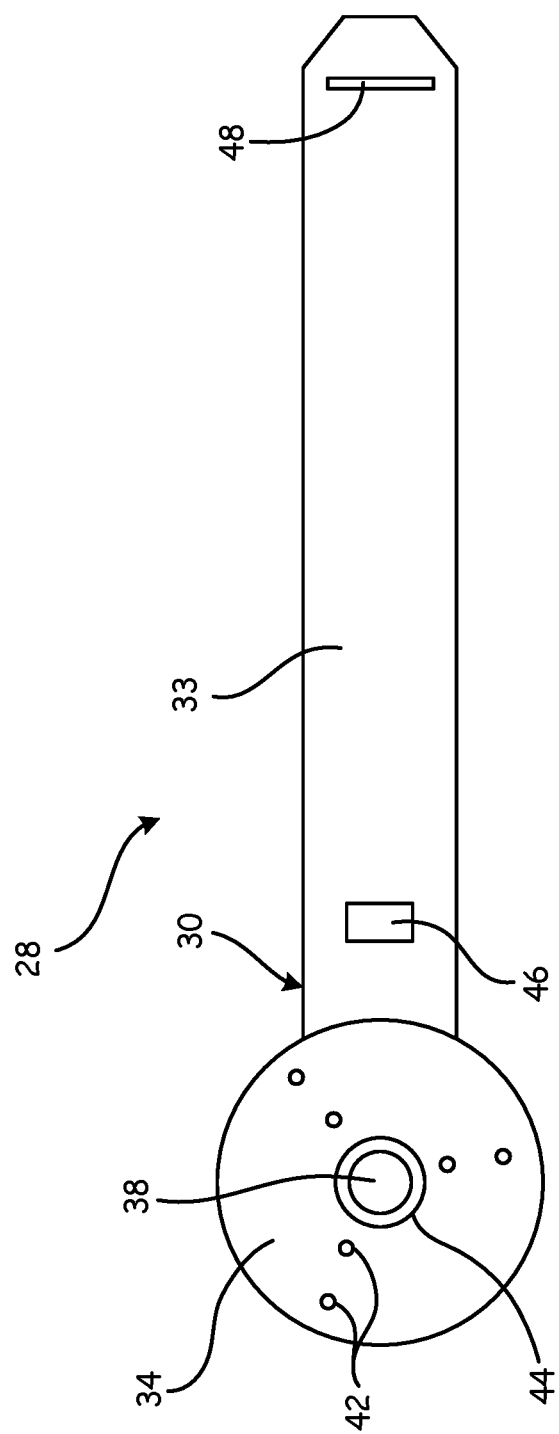
FIG. 2B is a top view of a point marker base with a spinning ruler according to an embodiment of the present invention.

FIG. 2A is a side view of point marker base 28 with spinning ruler 30 showing axis A-A. FIG. 2B is a top view of point marker base 28 with spinning ruler 30. FIG. 2C is a bottom view of point marker base 28 with spinning ruler 30. FIGS. 2A, 2B, and 2C will be discussed together. Point marker base 28 includes weighted mount 34, base 36, set screw 38, and fasteners 40. Weighted mount 34 includes leveler holes 42 and bore hole 44. Spinning ruler 30 includes disk 32 and ruler 33. Ruler 33 includes compass slot 46 and extension slot 48.

Spinning ruler 30 is rotatably mounted to point marker base 28 with disk 32 secured between weighted mount 34 and base 36. Base 36 is secured to weighted mount 34 by fasteners 40 extending through base 36 and into weighted mount 34. Disk 32 includes a central aperture (not shown) through which all fasteners 40 extend. In this way, base 36 and weighted mount 34 are secured without fasteners 40 engaging disk 32, such that spinning ruler 30 is freely rotatable about axis A-A, as shown in FIG. 2A. In the embodiment shown, ruler 33 is integral to disk 32 and extends perpendicular to axis A-A. While spinning ruler 30 is described as having ruler 33 integral with disk 32, it is understood that spinning ruler may include any suitable measuring instrument rotatable about axis A-A. For example, spinning ruler 30 may include a retractable tape measure rotatable about axis A-A or ruler 33 may be a collapsible or detachable ruler. Additionally, in some embodiments point marker base 28 may include a directional compass to allow orientation of the point marker base 28 according to cardinal directions, without the need for other reference points. Set screw 38 is screwed into weighted mount 34 through bore hole 44. It is understood that point marker base 28 and spinning ruler 30 may include indicia to allow for efficient and accurate locating, such as cross-hair lines across a top of point marker base 28 for use in back-sighting and re-sectioning.

Ruler 33 is usable to measure a distance from axis A-A to locate wall lines WL relative to defined point DP. In this way, ruler 33 allows wall lines WL to be located relative to a defined point DP that falls within a radius of point marker base 28, as established by ruler 33. When defined point DP falls outside of the radius established by ruler 33, the user may attach a standard tape measure or other measuring apparatus to extension slot 48. In this way, extension slot 48 is configured to allow the user to locate defined point DP at any reasonable distance away from axis A-A. In addition, compass slot 46 allows spinning ruler 30 to function as a drafting compass. For example, compass slot 46 may be utilized to place angled wall marks 18 on the construction site.

Figure 3:
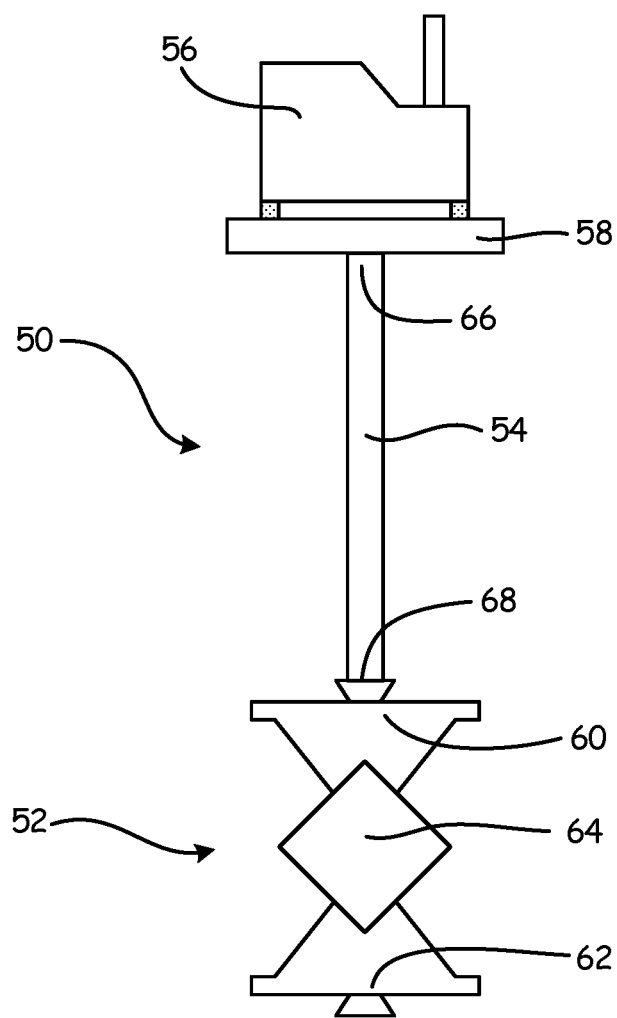
FIG. 3 is a perspective view of a prism pole according to an embodiment of the present invention.

FIG. 3 is a perspective view of a prism pole 50 for use with electronic surveying equipment (not shown). Prism pole 50 includes prism assembly 52, shaft 54, remote control 56, and protective bumper 58. Prism assembly 52 includes first attachment portion 60, second attachment portion 62, and prism 64 secured between first attachment portion 60 and second attachment portion 62. Shaft 54 includes first end 66 and second end 68 opposite first end 66.

Remote control 56 is mounted to first end 66 of shaft 54. Protective bumper 58 is mounted between remote control 56 and first end 66. Protective bumper 58 is configured to prevent both remote control 56 and prism assembly 52 from being damaged if prism pole 50 falls over. Prism assembly 52 is mounted to shaft 54 by attaching first attachment portion 60 to second end 68.

Prism 64 is mounted near the base of prism pole 50. By mounting prism 64 near the base of prism pole 50, any offset from vertical experienced by prism pole 50 will have a negligible impact on the position of the base and the placement of wall lines WL at the construction site. Additionally, while it is impractical to mount prism 64 near the base of prism pole 50 while conducting a conventional survey, due to the contour of the earth possibly cutting off a line of sight between the electronic surveying equipment and prism 64, a construction site is typically level, which ensures an unbroken line of sight from the electronic surveying equipment to prism 64.

Figure 4:
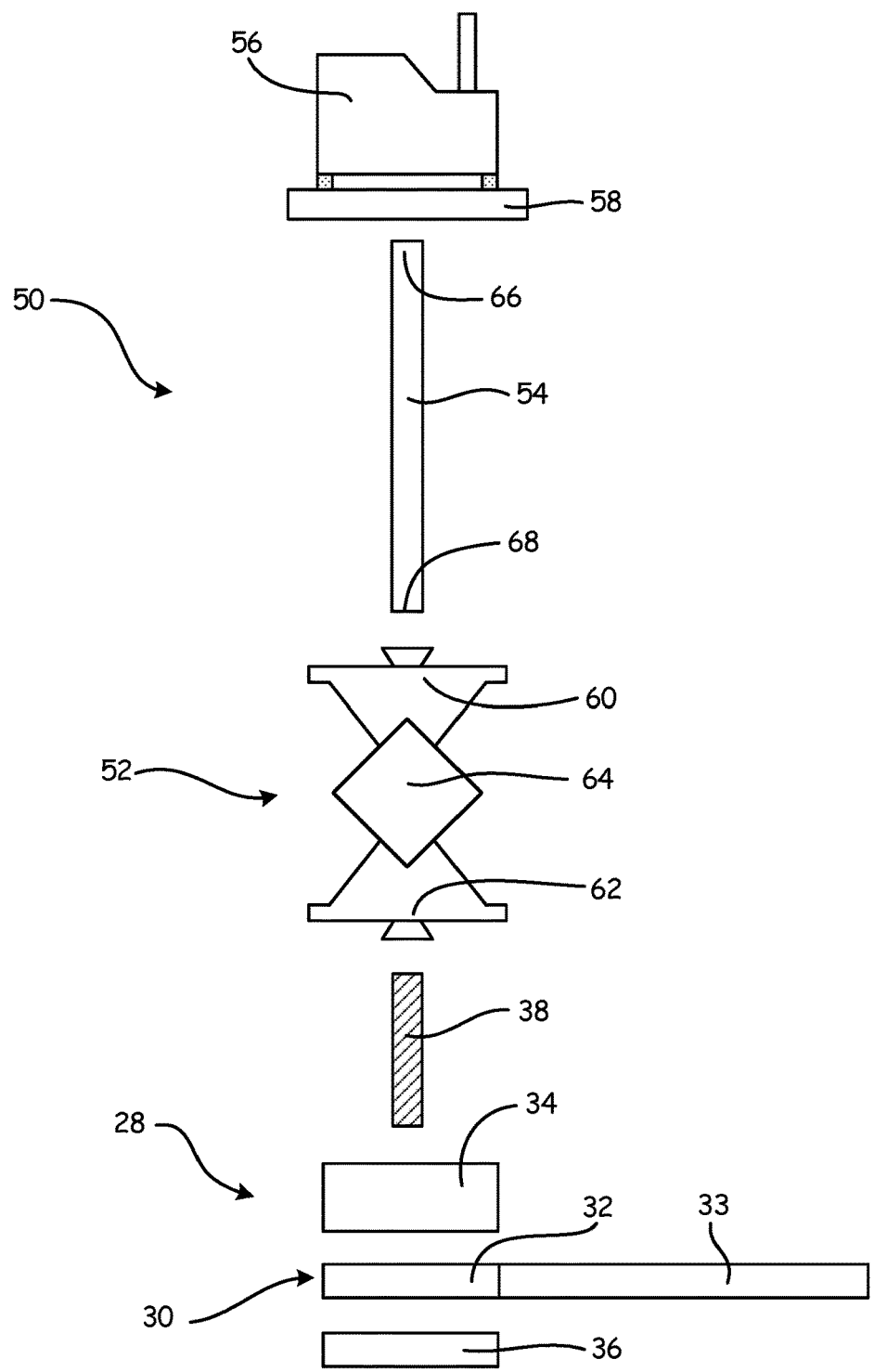
FIG. 4 is an exploded view of a prism pole for mounting on a point marker base with a spinning ruler.

FIG. 4 is a partially exploded view of point marker base 28 and prism pole 50. Point marker base 28 includes spinning ruler 30, weighted mount 34, base 36, set screw 38, and fasteners 40. Weighted mount 34 includes leveler holes 42 and bore hole 44. Spinning ruler 30 includes disk 32 and ruler 33. Ruler 33 includes compass slot 46 and extension slot 48. Prism pole 50 includes prism assembly 52, shaft 54, remote control 56, and protective bumper 58. Prism assembly 52 includes first attachment portion 60, second attachment portion 62, and prism 64 mounted between first attachment portion 60 and second attachment portion 62. Shaft 54 includes first end 66 and second end 68 opposite first end 66.

Disk 32 is secured between weighted mount 34 and base 36. Base 36 is secured to weighted mount 34 by fasteners 40 extending through base 36 and into weighted mount 34. Base 36 and weighted mount 34 are secured such that disk 32 is freely rotatable about axis A-A. In the embodiment shown, ruler 33 is integral with disk 32 and extends perpendicularly from axis A-A. Remote control 56 is mounted to first end 66 of shaft 54. Protective bumper 58 is mounted between remote control 56 and first end 66, and protective bumper 58 is configured to protect remote control 56 and prism 64 from damage. First attachment portion 60 is attached to second end 68 to mount prism assembly 52 to shaft 54.

Point marker base 28 is attached to prism pole 50 by set screw 38. Set screw 38 is attached within bore hole 44 and to second attachment portion 62 of prism assembly 52. Leveler holes 42 are configured to accept leveling screws between weighted mount 34 and second attachment portion 62. The leveling screws allow the prism 64 to be leveled on point marker base 28 even when operating on an uneven construction site. While leveler holes 42 are described as accepting leveling screws between weighted mount 34 and second attachment portion 62, it is understood that leveler holes 42 may be located at any suitable position on point marker base 28. For example, leveler holes 42 may project through base 36, such that leveling screws would be disposed between base 36 and the ground.

Prism 64 is mounted near the base of prism pole 50. For example, in the embodiment shown prism assembly 52 is mounted directly adjacent to point marker base 28. Mounting prism assembly 52 near the base of prism pole 50 and directly adjacent to point marker base 28 ensures that prism 64 will provide an accurate reference point R for the total station. To ensure an accurate reading, prism 64 is preferably mounted within 3.125 inches of a bottom of point marker base 28. Prism 64 is also preferably located within 2.75 inches from ruler 33. By mounting prism 64 near the base of prism pole 50, any offset from vertical experienced by prism pole 50 will have a negligible impact on the position of the base and the placement of wall lines WL at the construction site. If the line of sight between the electronic surveying equipment and prism 64 cannot be maintained by mounting prism 64 at a height of 3.125 inches above the ground, then prism 64 may be mounted higher on prism pole 50 and a leveling mechanism may be utilized to ensure that prism 64 provides an accurate reference point R. Additionally, a level (not shown) may be included near the top of prism pole 50 to allow verification that prism 64 is sufficiently level to allow accurate readings from the electronic surveying equipment.

Weighted mount 34 is configured such that prism pole 50 will remain vertically oriented when prism pole 50 is placed on a point. Weighted mount 34 allows a single user to conduct construction layout even when adverse conditions, such as wind, would usually cause significant offset of prism 64 from the vertical, thereby causing inaccurate readings. Thus, while weighted mount 34 is described as including leveler holes 42, it is understood that prism 64 is mounted at a height such that prism 64 remains sufficiently level to provide accurate readings without the use of any leveling device in addition to point marker base 28. Additionally, while prism pole 50 is described as secured to point marker base 28 with set screw 38, it is understood that any suitable connection, such as a ball and socket joint within point marker base 28, may secure prism pole 50 to point marker base 28. It is also to be understood that the other suitable connections may serve as a leveling mechanism for prism 64 to ensure that prism 64 remains sufficiently level.

Figure 5A:
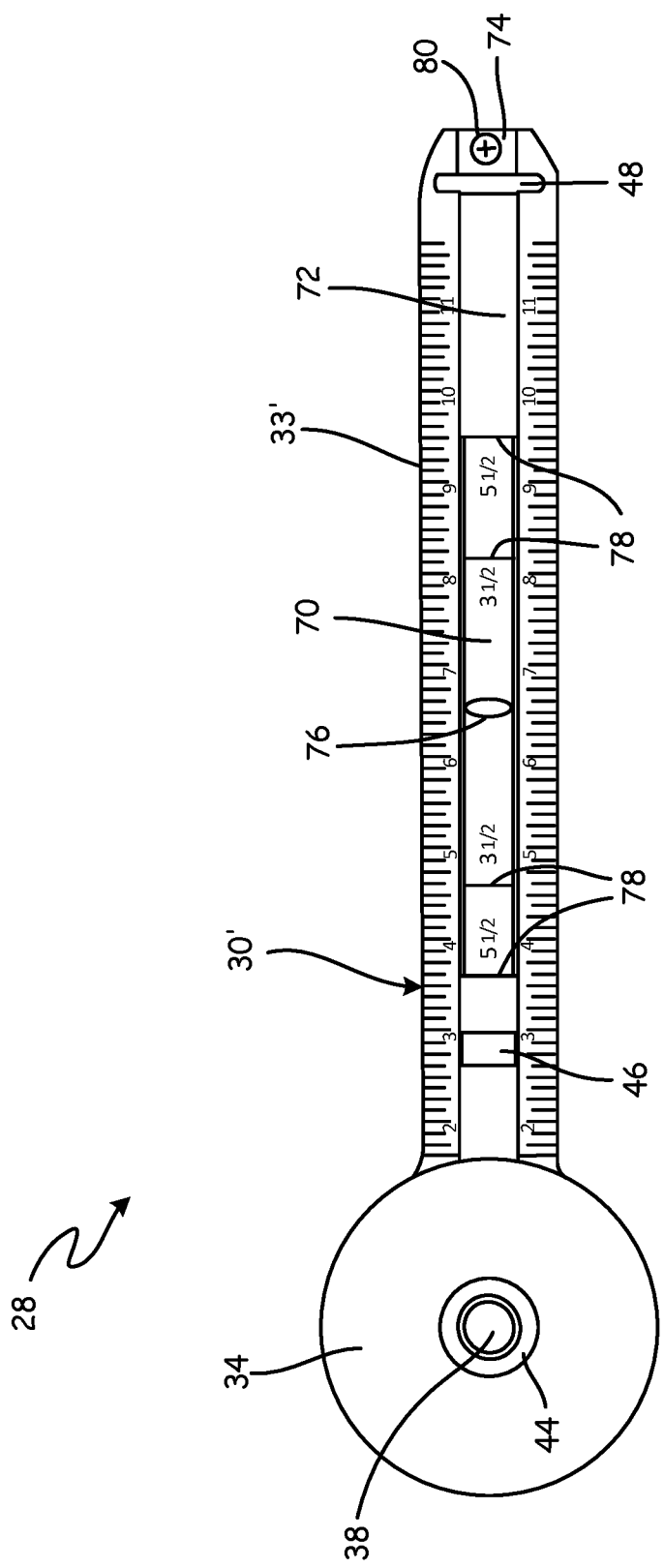
FIG. 5A is a top view of a point marker base with a spinning ruler according to an embodiment of the present invention.
Figure 5B:
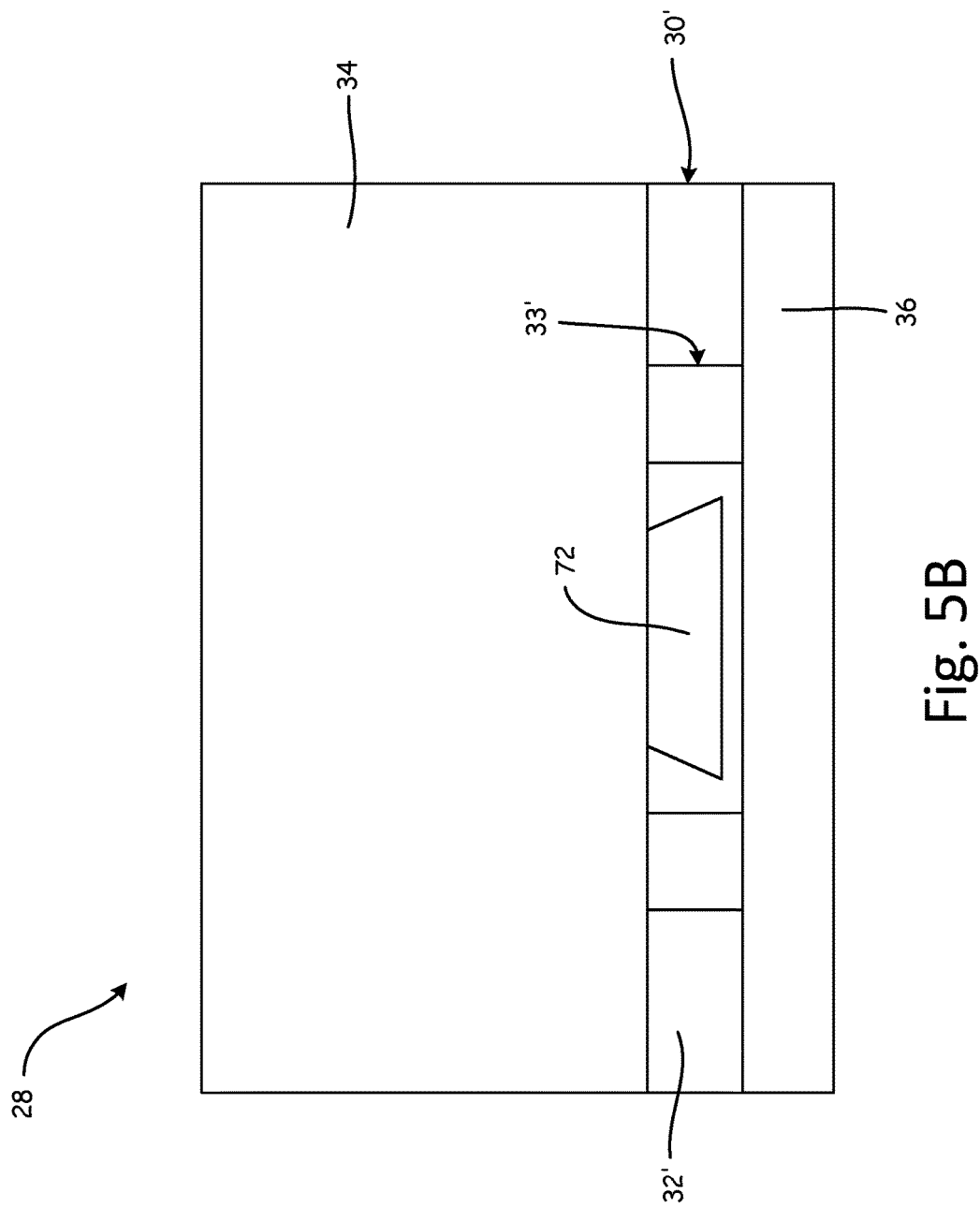
FIG. 5B is a front elevation view of a point marker base with a spinning ruler according to an embodiment of the present invention.

FIG. 5A is a top view of point marker base 28 with spinning ruler 30'. FIG. 5B is a front elevation view of point marker base 28 with spinning ruler 30' showing axis A-A. FIGS. 5A and 5B will be discussed together. Point marker base 28 includes weighted mount 34, base 36, and set screw 38. Weighted mount 34 includes bore hole 44. Spinning ruler 30' includes disk 32', ruler 33', and slider 70. Ruler 33' includes compass slot 46, extension slot 48, channel 72, and stop 74. Slider 70 includes grip 76 and wall line indicators 78.

Similar to spinning ruler 30, spinning ruler 30' is rotatably mounted to point marker base 28 with disk 32' secured between weighted mount 34 and base 36. Set screw 48 is screwed into weighted mount 34 through bore hole 44. Set screw 38 is configured to engage with and support prism pole 50 (shown in FIGS. 3 and 4) on point marker base 28. Channel 72 extends along a length of ruler 33'. Channel 72 receives slider 70, and channel 72 allows slider 70 to move along the length of ruler 33'. With slider 70 disposed within channel 72, stop 74 is secured to ruler 33' by fastener 80 extending through stop 74 and into ruler 33'.

Like ruler 33, ruler 33' is usable to measure a distance from axis A-A to locate wall lines WL relative to defined points DP. Ruler 33' allows wall lines WL to be located relative to a defined point DP that falls within a radius of point marker base 28', as established by ruler 33'. Grip 76 allows a user to grasp slider 70 and to move slider 70 along channel 72. Slider 70 includes wall line indicators 78 to allow the user to quickly mark each wall line WL relative to a defined point DP. Wall line indicators 78 are set a predetermined distance on each side of grip 76 to indicate the location of wall lines WL to the user. It is understood that slider 70 may include multiple sets of wall line indicators 78 to allow the user to mark wall lines WL for walls of varying thicknesses. For example, a first set of wall line indicators 78 may be located 1.75 inches (4.45 centimeters) to either side of grip 76, which first set of wall line indicators 78 provides the user with the location of wall lines WL for a standard 2×4 wall. A second set of wall line indicators 78 may be located 2.75 inches (6.99 centimeters) to either side of grip 76, which second set of wall line indicators 78 provides the user with the location of wall lines WL for a 2×6 wall. Slider 70 may include wall line indicators 78 associated with any desired wall width. While slider 70 has been described as including wall line indicators 78 for wood-framed walls, slider 70 may include wall line indicators 78 for masonry or any other suitable building material. Where slider 70 includes wall line indicators 78 for masonry, wall line indicators 78 may preferably be set to have a total width ending with 0.625 inches (1.587 centimeter), instead of ending with 0.5 inches (1.3 centimeter) as is standard for wood-framed walls. Moreover, stop 74 may be removed from ruler 33' to allow slider 70 to be removed from channel 72 and another slider may be inserted. As such, the user may locate wood-framed walls with a first slider having wall line indicators set for wood-framed walls. The user may then locate masonry utilizing the same ruler and point marker base by merely removing the first slider and inserting a second slider having wall line indicators set for masonry.

Referring specifically to FIG. 5B, ruler 33' includes channel 72 which allows slider 70 to move along a length of ruler 33'. In the present embodiment, channel 72 has a trapezoidal cross-section. Where channel 72 is trapezoidal, slider 70 has a matching trapezoidal cross-section to allow slider 70 to mate with channel 72. The trapezoidal cross-section of channel 72 secures slider 70 within channel 72 while allowing slider 70 to translate along a length of ruler 33'. While channel 72 is described as having a trapezoidal cross-section, it is understood that channel 72 may take any suitable shape for securing slider 70 while allowing slider 70 to translate along a length of ruler 33'. For example, channel 72 may have a semi-circular cross-section, may have additional slots extending into ruler 33' and configured to accept flanges extending from slider 70, or may be of any other configuration suitable for receiving and securing slider 70.

Spinning ruler 30' allows a user to efficiently mark wall lines WL relative to a defined point DP without having to calculate offsets from defined point DP to account for varying wall thicknesses. For example, a defined point DP for a unit wall may be located 5 inches (12.7 centimeters) to the relative west of point marker base 28'. To locate wall lines WL associated with the defined point DP, the user rotates ruler 33' about point marker base 28' such that ruler 33' points relative west. The user shifts slider 70 such that grip 76 is positioned at a five inch mark on ruler 33'. In this way, grip 76 functions as an indicator aligned with defined point DP. With grip 76 aligned with defined point DP, wall line indicators 78 allow the user to quickly and efficiently mark the location of the wall lines WL. Label 26 (shown in FIG. 1) informs the user of the wall thickness. Given the thickness of the wall associated with defined point DP, the user consults slider 70 and utilizes the appropriate set of wall line indicators 78 on slider 70 to mark the location of wall lines WL.

Figure 6:
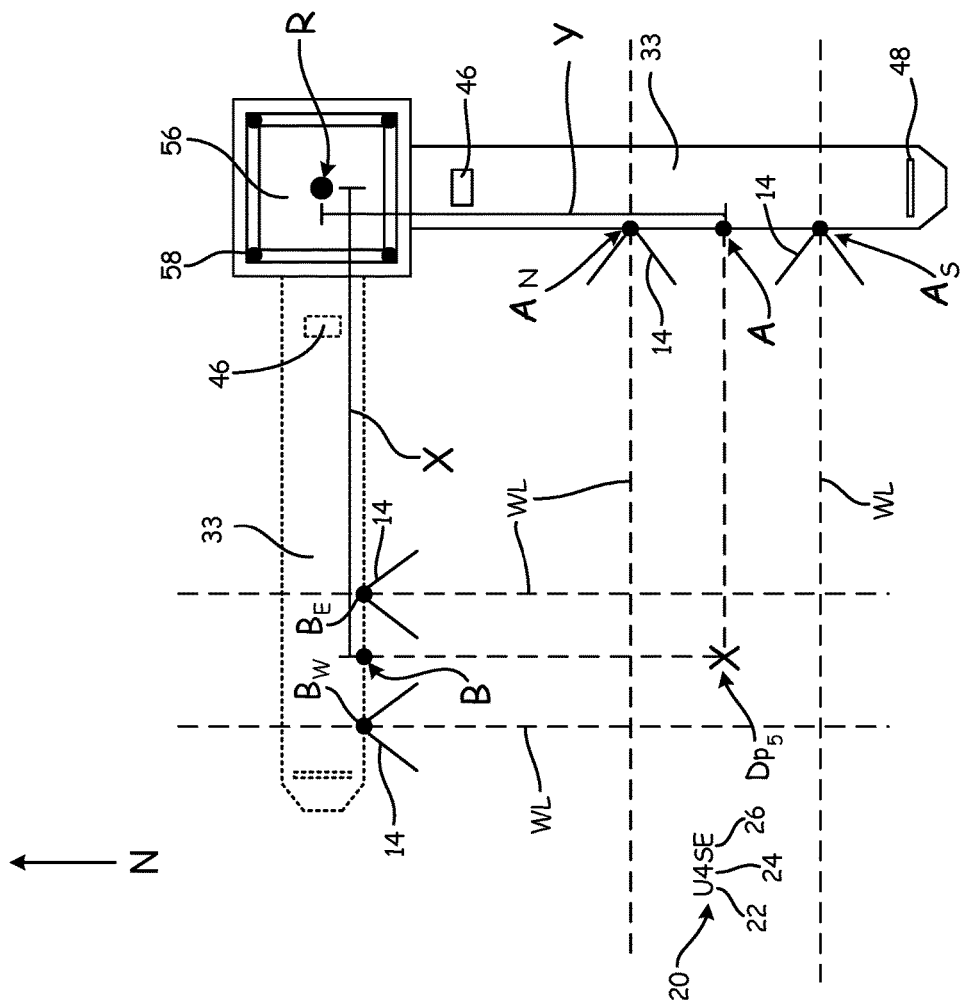
FIG. 6 is a top view of a prism pole mounted on a point marker base with a spinning ruler.

FIG. 6 is a top view of point marker base 28 and prism pole 50, showing the use of point marker base 28 and prism pole 50. As shown above in FIG. 2A, point marker base 28 includes weighted mount 34, ruler 33, disk 32, and base 36. Disk 32 is rotatably secured between weighted mount 34 and base 36. Ruler 33 includes compass slot 46 and extension slot 48, and ruler 33 is integral with disk 32. As discussed above with regard to FIG. 3, prism pole 50 includes prism assembly 52, shaft 54, remote control 56, and protective bumper 58. Prism assembly 52 includes first attachment portion 60, second attachment portion 62, and prism 64 secured between first attachment portion 60 and second attachment portion 62. Shaft 54 includes first end 66 and second end 68 opposite first end 66. Prism assembly 52 is mounted near the base of prism pole 50 to ensure that prism 64 remains vertically oriented. Second attachment portion 62 of prism assembly 52 is secured to point marker base 28 adjacent to weighted mount 34.

Point marker base 28 and prism pole 50 may be utilized to conduct construction layout. To mark defined points DP, floor plan 10 (shown in FIG. 1) is uploaded to a total station. Floor plan 10 is oriented on the site using a relative directional orientation. The relative directional orientation, such as relative north, south, east, and west, used to convey the offset information, is established for the particular walls that are being laid out. Various relative directional orientations may be utilized for different parts or subsections of a building or unit. The user may have a handheld unit (not shown) that communicates with the electronic surveying equipment via remote control 56.

To locate wall lines WL, prism pole 50 is mounted to point marker base 28. Prism pole 50 is set up near the defined point DP that is being located, and the prism pole 50 establishes reference point R used to locate wall lines WL. Point marker base 28 ensures that prism 64 is sufficiently level for conducting construction layout because prism 64 is mounted near the base of prism pole 50. Prism 64 is used to establish reference point R, and the electronic surveying equipment then provides the offset distances to defined points DP relative to reference point R. Specifically, the user selects the defined point DP that the user is locating as a reference point with the handheld unit. The handheld unit communicates this information to the total station. The electronic surveying equipment locates prism 64 and informs the user of the offset distance between reference point R and defined point DP via the handheld unit. The offset information is conveyed in terms of the relative directional orientation established for floor plan 10. Point marker base 28 and spinning ruler 30 are used to locate the desired wall lines on the construction site.

Description 20 provides the thickness T of any wall and instantly provides the location of wall lines WL. If the defined point DP is a defined point within a unit wall or a corridor wall, description 20 provides the distance to the wall centerline. If the defined point DP is a defined point for an exterior wall, description 20 provides the distance to one of the wall lines WL. For defined points DP associated with unit walls, corridor walls, or exterior walls, description 20 allows the faces of wall 12 to easily be located and marked. Thus, description 20 and point marker base 28 with spinning ruler 30 enables wall lines WL to be located on the construction site without additional visual plan aids.

The process may be illustrated by an example of locating defined point $DP_5$ in FIG. 6. Prism pole 50 is attached to point marker base 28, which is then placed a point to be used as the reference point R. In this way, the location of reference point R is established at the location of prism 64. Once reference point R is established, the wall lines WL associated with defined point $DP_5$ that are being laid out are communicated to the total station. The electronic surveying equipment locates prism 64, reads the location of prism 64, and utilizes the location of prism 64 as reference point R.

The electronic surveying equipment communicates an offset distance from reference point R to defined point $DP_5$. Given the relative directional orientation indicated in FIG. 6, the electronic surveying equipment communicates that defined point $DP_5$ is located distance Y south and distance X west of reference point R.

Defined point $DP_5$ has a description 20 that reads "U4NE." Because defined point $DP_5$ has a wall designation "U," it is known that defined point $DP_5$ is centered within an interior wall. Unit designation of "4" indicates that defined point $DP_5$ lies within unit 4. Label 26 of "NE" also provides that orienting arrows 14 will point relative east and relative north from defined point $DP_5$. In fact, label 26 of "NE" also denotes that defined point $DP_5$ lies at the intersection of two unit walls because a first wall will project relative north and a second wall will project relative east. Because both walls are unit walls, defined point $DP_5$ lies on the centerline of both unit walls. Additionally, because label 26 does not include a numeral, both unit walls are standard 3.5 inch walls.

Given the information conveyed by description 20, a point Y distance south of reference point R is measured along ruler 33, shown as point A. Because description 20 conveyed that defined point $DP_5$ lies in the center of a standard wall, a distance of 1.75 inches is measured to the north of point A along ruler 33, indicated as point $A_N$. Additionally, a distance of 1.75 inches is measured to the south of point A along ruler 33, indicated as point $A_S$. Points $A_N$ and $A_S$ lie on the wall lines WL for the east-west running wall being marked. Orienting arrows 14 for the wall lines associated with points $A_N$ and $A_S$ will point east, as indicated by label 26. Alternatively, the user may utilize a ruler, such as ruler 33' (shown in FIG. 5A), to determine the locations of points $A_N$ and $A_S$ relative to point A. As discussed above, ruler 33' includes slider 70, which indicates the location of wall lines WL relative to the defined point $DP_5$. Slider 70 would be shifted along ruler 33' such that grip 76 is aligned with point A. With grip 76 aligned with point A, wall line indicators 78 are aligned with points $A_N$ and $A_S$ such that wall line indicators 78 visually indicate the location of wall lines WL relative to defined point $DP_5$. Label 26 informs the user of which pair of wall line indicators 78 accurately provides the actual width of the wall. In the present example, label 26 does not include a numeral, thereby indicating that the unit walls are standard 3.5 inch walls; thus, the user would utilize the wall line indicators 78 that are spaced 3.5 inches apart.

Ruler 33 is then spun around point marker base 28 so ruler 33 is pointed west, shown in FIG. 6 in dashed lines. With ruler 33 pointing west, a spot a distance X west of reference point R along ruler 33 is marked, shown as point B. Once again, description 20 conveys that defined point $DP_5$ is centered within an interior wall and that that interior wall is a standard 3.5 inch wall. Thus, point B is located at the centerline of the north-south oriented wall that is being marking. To mark the locations of the wall lines WL, a distance of 1.75 inches to the west of point B is measured along ruler 33, indicated as point B. Additionally, a distance of 1.75 inches to the east of point B is measured along ruler 33, indicated as point $B_E$. Points $B_W$ and $B_E$ are thus located on the wall lines WL of the north-south wall that is being marking. Because label 26 reads "N," it is known that the wall extends to the north of $DP_5$, and thus orienting arrows 14 for the wall lines WL indicated by point $B_W$ and $B_E$ will point north. Floor plan 10 is reconstructed at full size on the site by marking all of the wall lines WL on the construction site, and then connecting all of the orienting arrows 14 to their corresponding orienting arrows 14 on the site. Similar to locating point A, point B may be located utilizing ruler 33', and the wall lines associated with point B may be located utilizing ruler 33' and slider 70.

Point marker base 28 and prism pole 50 allow a single user to conduct the construction layout for an entire construction site. Description 20 provides all of the necessary information needed to accurately and efficiently locate wall lines WL during construction layout. Spinning ruler 30 allows all of the wall lines WL to be located relative to defined points DP, and description 20 provides the orientation of the walls and the thickness of the walls. This allows a single user to accurately mark and align all of the wall lines WL on the construction site.

Multiple wall lines may be located from a single reference point R without having to directly locate any defined point DP. Once reference point R is established, multiple wall lines can be located with point marker base 28 utilizing that single reference point R. Defined point DP allows accurate locating of wall lines WL on the construction site, but point marker base 28, spinning ruler 30, and description 20 allows direct marking of wall lines WL without having to mark any defined point DP directly on the site. Defined points DP provide a relative relation to wall lines WL, which relative relation is used to locate and mark the location of wall lines WL. Moreover, additional wall lines that fall outside the radius of ruler 33 may be located utilizing the same reference point R by attaching an additional measuring instrument to extension slot 48. This is especially useful when laying out walls that run in a straight line over a long distance, such as exterior walls or corridor walls.

Figure 7:
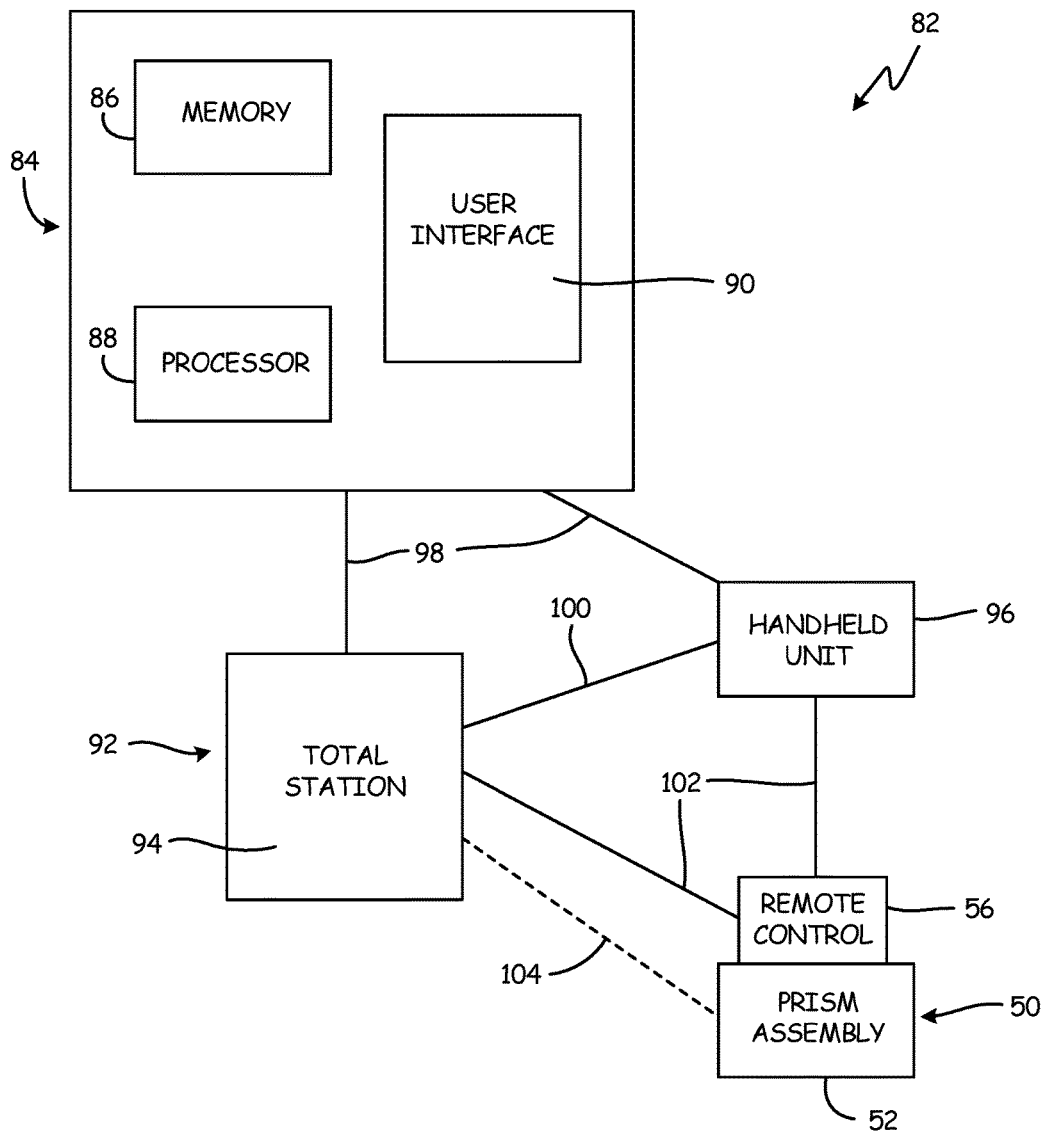
FIG. 7 is a block diagram of a system for converting a floor plan to full size and for locating wall lines according to an embodiment of the present invention.

FIG. 7 is a block diagram of system 82 for converting a floor plan to full size and for locating wall lines WL during construction layout. System 82 includes computer 84, and computer 84 includes memory 86, processor 88, and user interface 90. System 82 further includes electronic surveying equipment 92, and electronic surveying equipment includes total station 94, handheld unit 96, and prism pole 50. Prism pole 50 includes prism assembly 52 and remote control 56.

Memory 86 stores a floor plan, such as floor plan 10, and software for converting the floor plan for use in construction layout. Converting the floor plan may include importing seed points from the processor directly into the plan on a new layer or tab on top of the electronic representation of the floor plan for enabling the processor to fully create descriptions 20. Processor 88 executes the software to establish wall lines and defined points DP at desired locations on the floor plan. The software assigns a description, such as description 20, to each defined point DP based on the location of the defined point DP, the nature of the wall 12 that the defined point DP lies on, and the nature of any walls extending from defined point DP. User interface 90, such as a keyboard, monitor, and mouse, allow a user to manipulate the floor plan, such as to assign relative north. In addition, the user may set the location of seed points on the floor plan, which provide rules to the software to ensure that the floor plan is accurately converted for use in construction layout. The converted floor plan is stored in memory 86.

To reproduce the floor plan at full scale on the construction site, the converted floor plan is uploaded from memory 86 to total station 94 or handheld unit 96 through communication link 98. Communication link 98 may be a wired or wireless connection. The converted floor plan may also be stored on removable memory, such as a flash drive, to provide the converted floor plan from memory 86 to total station 94 or handheld unit 96. The user controls total station 94 with handheld unit 96. Handheld unit 96 may communicate directly with total station 94 through communication link 100, or handheld unit 96 may communicate with total station 94 through communication links 102 and remote control 54. Using handheld unit 96, the user instructs total station 94, through communication links 100, 102, to locate prism assembly 52 and to provide an offset distance to a defined point DP that the user is attempting to locate. Total station 94 locates prism assembly 52 and determines a position of prism assembly 52 with electronic distance measurement (EDM) signal 104. EDM signal 104 may be a modulated infrared carrier signal generated by total station 94 and reflected by prism assembly 52. Total station 94 calculates the location of defined point DP relative to prism pole 50 and provides the offset information to the user through handheld unit 96.

Figure 8A:
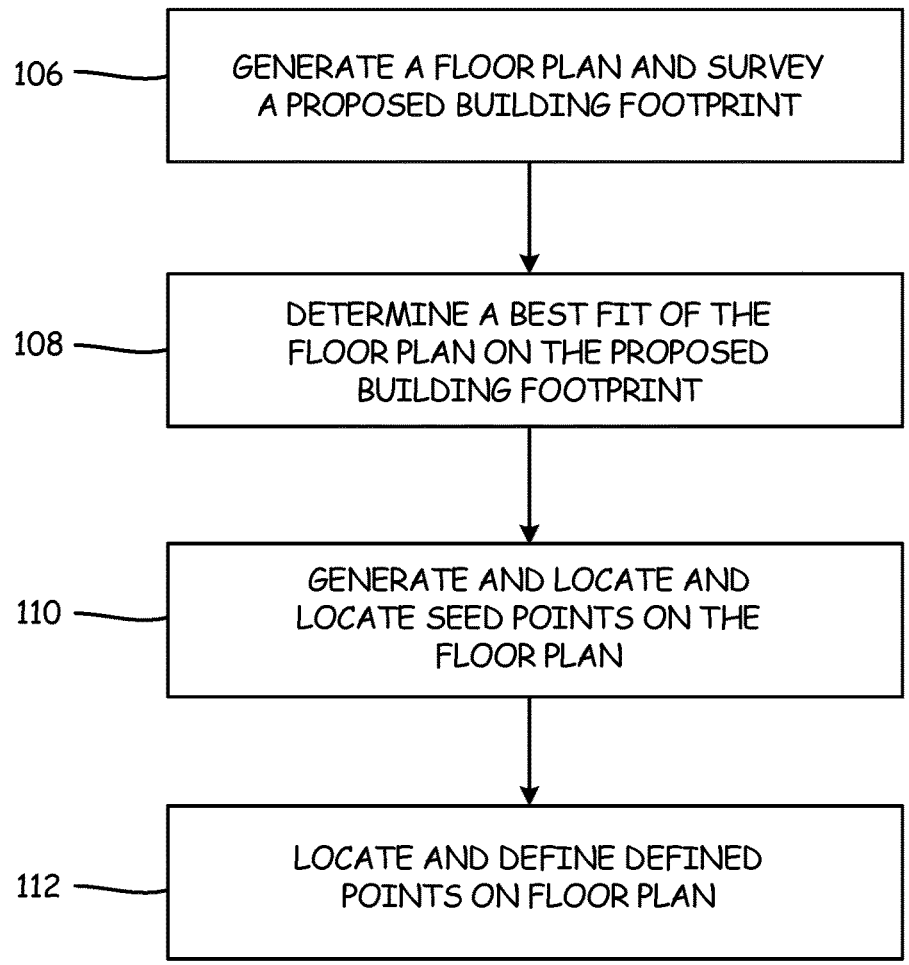
FIG. 8A is a flow diagram of a method of converting a floor plan to full size for construction layout according to an embodiment of the present invention.

FIG. 8A is a flow diagram illustrating a method for converting a floor plan for construction layout. In step 106, a floor plan, such as floor plan 10, is received and stored in memory 86 (FIG. 7), and a survey of the proposed building footprint is conducted. The survey information is similarly stored in memory 86. During step 108, a best fit for the floor plan on the building footprint is established. Processor 88 (FIG. 7) receives both the survey and the floor plan and executes software to determine a best fit for the floor plan, which may be based on the dimensions of the foundation, the location of the corners of the foundation, and various other factors. The best fit may be established to meet the user's requirements, such as minimizing error around the foundation or any other desired requirement by the user. Generating a best fit for the floor plan includes establishing a relative north for the floor plan and the building survey, which establishes the relative directions assigned to each defined point DP. During step 108 additional backsight points BP may also be established for the floor plan. The additional backsight points BP remain at the same coordinates regardless of the level or floor of the floor plan. As such, the backsight points BP establish absolute reference points for each floor of a multi-story building. Processor 88 may establish a location of backsight points BP on floor plan 10. Backsight points BP are preferably located such that the backsight points BP carry vertically through each floor and are located at an unimpeded location, such as in the middle of a corridor, on each floor. The floor plan and backsight points are stored in memory 86.

In step 110, seed points are generated and located on the floor plan. The user may use user interface 90 (FIG. 7) to place seed points at desired locations on the floor plan. The seed points may include a variety of seed points with each seed point having an assignment attached to the seed point. For example, a first seed point may include a first assignment telling the software to draw a horizontal line, such as a line running relative east and west, beginning at the first seed point and continuing until the software encounters a vertical line, such as a line running relative north and south, from a second seed point. The second seed point may similarly include a second assignment telling the software to draw a vertical line beginning at the second seed point and continuing until the software encounters a horizontal line from a first seed point. The user may thus place the first seed point at an upper right-hand corner of the building exterior and place the second seed point at a lower left-hand corner of the building exterior. The lines extending from the two seed points would meet and terminate at the upper left-hand corner of the building exterior, thereby establishing two of the exterior wall lines of the building. In step 110, seed points are located at all relevant locations on the building, such as the exterior and corridor walls and at unit partitions between various units within the building, such that the software accurately draws the wall lines. As such, the seed points allow the user to provide additional commands to the software to ensure that the floor plan is identifiable for the conversion features the software will create. Once the seed points are generated and located, the floor plan is saved in memory 86.

Seed points may be used to establish the nature of various wall lines, such as establishing each wall line as an exterior, a corridor, or a unit wall line. The user may use the user interface 90 to indicate the perimeter of the building, establishing exterior wall lines, and to establish the corridor. For example, using user interface 90, the user may draw a block in the corridor and indicate that all walls surrounding the block are corridor walls. With exterior and corridor walls established, the remaining walls are unit walls. In this way, the seed points inform the software of the nature of the various walls on the floor plan.

In step 112, the processor 88 executes the software to create defined points according to the floor plan and the seed point assignments. It is understood that the defined points may be generated and viewed as a separate tab or layer on the floor plan, such that the defined points suitable for construction layout is separable from the original floor plan. In addition, a layer containing the defined points may be laid over the original floor plan displaying the wall lines, thereby allowing the user to check the accuracy of the defined points and descriptions through the user interface. The software utilizes the information regarding the nature of the walls provided in step 110 to locate the defined points at appropriate locations, such as on the midline of a wall for a defined point for a unit wall, and to provide an accurate description for each defined point. Defined points DP are established at all relevant locations, such as at control points, at the intersection of walls, and at the distal end of a partition. As each defined point is located, a description 20 is assigned to each defined point DP. The description 20 provides the user with all necessary information for locating wall lines WL relative to any defined point DP. With defined points DP established and defined, floor plan 10 is stored in memory 86.

Figure 8B:
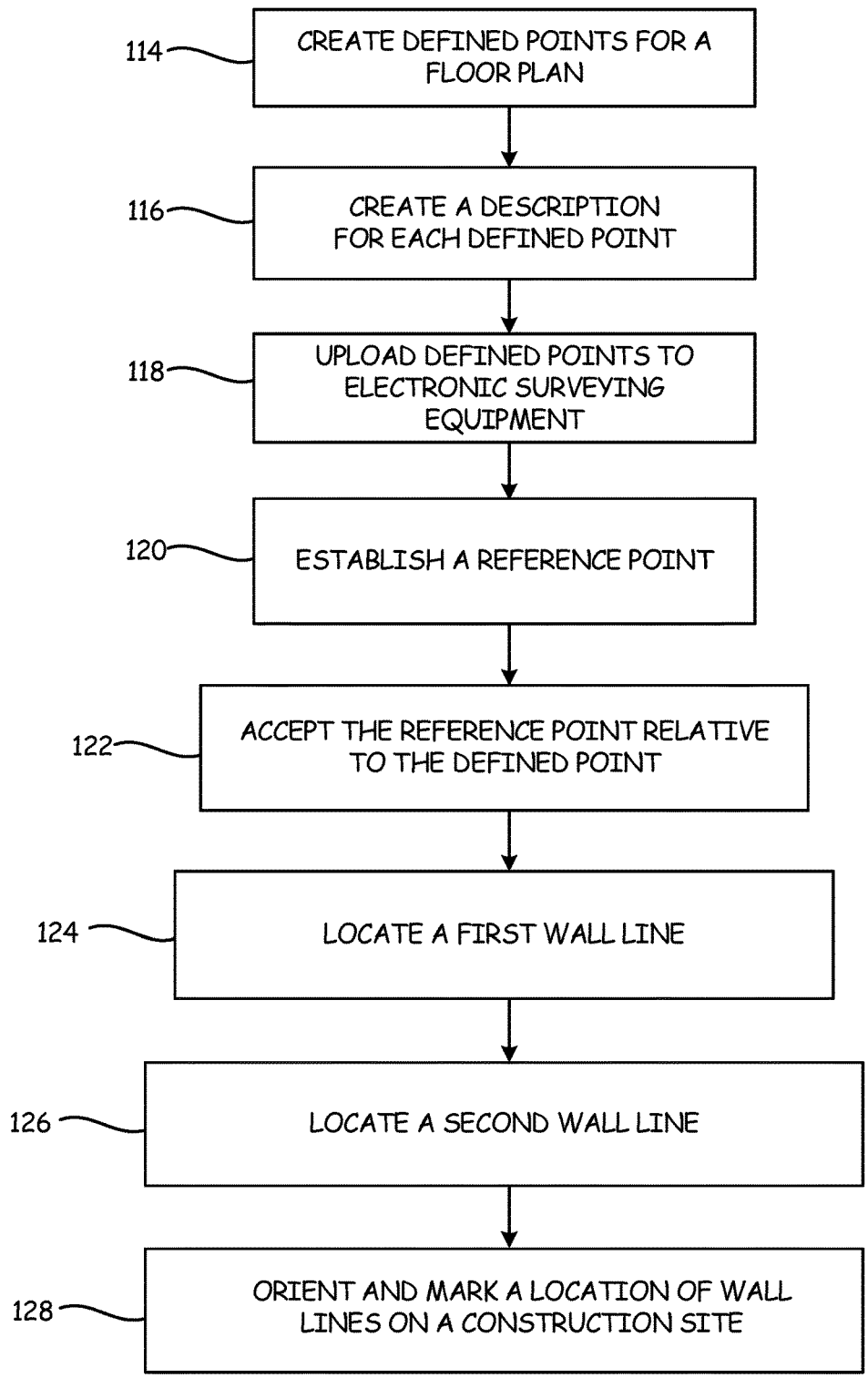
FIG. 8B is a flow diagram of a method of locating wall lines according to an embodiment of the present invention.

FIG. 8B is a flow diagram illustrating a method for placing points during construction layout. In step 114, floor plan 10 is created and defined points DP are established for that floor plan 10. During construction layout, floor plan 10 is scaled to full size and located on the construction site. Specifically, walls 12 are outlined on the construction site at full size by locating wall lines WL on the construction site. During step 114, the actual locations of the corners of the structure are located on the construction site, and the locations of these corners serve as a reference during the layout of other the wall lines WL. In step 116 a description is created for each defined point DP. The description provides the relevant locational information associated with that defined point DP. In step 118, defined points DP created in step 114 and descriptions created in step 116 are uploaded from memory 86 to electronic surveying equipment 92.

In steps 120 and 122, reference point R is established and accepted relative to defined point DP. In step 120, prism pole 50 is secured to point marker base 28. The combined point marker base 28 and prism pole 50 are set at a desired location on the site, which desired location will be utilized as reference point R. In step 122, reference point R is accepted provided that point marker base 28 and prism pole 50 are within working distance of defined point DP. Electronic surveying equipment 92 locates prism 64 and provides a reading that indicates the location of defined point DP relative to reference point R. The user uses handheld unit 96 to direct total station 94 to locate a defined point DP relative to reference point R. The offset distances provided by the electronic surveying equipment 92 provide the necessary information to determine if reference point R is within working distance of defined point DP. The offset distance is provided to user on handheld unit 96. While an acceptable working distance is preferably within a length of ruler 33, it is understood that the user may attach a standard tape measure or other measuring apparatus to extension slot 48, which provides the ability to measure an additional distance away from point marker base 28.

In steps 124 and 126, the locations of wall lines WL are determined using the offset information from reference point R to defined point DP provided by the electronic surveying equipment. The description of defined point DP provides relevant dimensional information for the wall that is being marked, such as thickness and orientation. The description also indicates the location of defined point DP relative to the wall lines WL being marked. As previously described, if the description includes wall designation "E," then that defined point DP lies on the interior side of an exterior wall. For an exterior wall, the offset distance is measured along the ruler, and that distance is used to establish a first wall line. For an exterior wall, the second wall line is marked by measuring the thickness of the wall along ruler 33 from the first wall line towards the exterior of the building, away from the interior of the unit. For a corridor wall or a unit wall, the midline of the wall is located by measuring the offset distance along the ruler. A device, such as slider 70, may be utilized to mark the first wall line and the second wall line by utilizing the appropriate wall line indicators given the thickness of the wall.

However, if the description includes a wall designation "U," indicating a unit wall, or a wall designation "C," indicating a corridor wall, then the defined point DP lies at the centerline of the unit wall or corridor wall, as previously described. To locate the wall lines for a unit wall or a corridor wall, the offset distance provided by the electronic surveying equipment is measured, which gives the location of the centerline of the unit wall or the corridor wall. The first and second wall lines may be marked by utilizing a device, such as slider 70. The user moves slider 70 such that an indicator, such as grip 76, is aligned with the centerline of the wall, as indicated by the offset distance to the defined point DP. Wall line indicators on the device provide the user with the locations of the first wall line and the second wall line relative to the wall centerline. The user marks the first wall line and the second wall line using the appropriate wall line indicators, as dictated by the wall thickness.

Alternatively, the first wall line may be marked by measuring a distance equal to half the wall thickness, as indicated by the description, in a first direction perpendicular to the wall centerline, along ruler 33. The second wall line may be marked by measuring a distance equal to half the wall thickness, as indicated in the description, in a second direction opposite the first direction and perpendicular to the wall centerline, along ruler 33. For example, if label 26 of description 20 includes "6," then the wall is a 2×6 wall and that the wall is 5.5 inches thick, because a 2×6 wall has dimensions of 1.5 inches by 5.5 inches. Then the offset distance to defined point DP is measured and 2.75 inches to either side of defined point DP is marked, which gives the location of the wall lines.

In step 128 the wall lines are oriented and marked on the construction site. In step 128 orienting arrows 14 are located on the wall lines located in step 122. Orienting arrows 14 point along the wall lines in a direction indicated by description 20 of defined point DP. The wall lines are established by marking a line between two sets of associated orienting arrows 14. The wall lines run from one set of orienting arrows 14 at a first end of a wall that is being marked to an associated second set of orienting arrows 14 at a second end of the wall that is being marked, and the line establishes an edge of the wall at full size on the construction site.

Figure 9A:
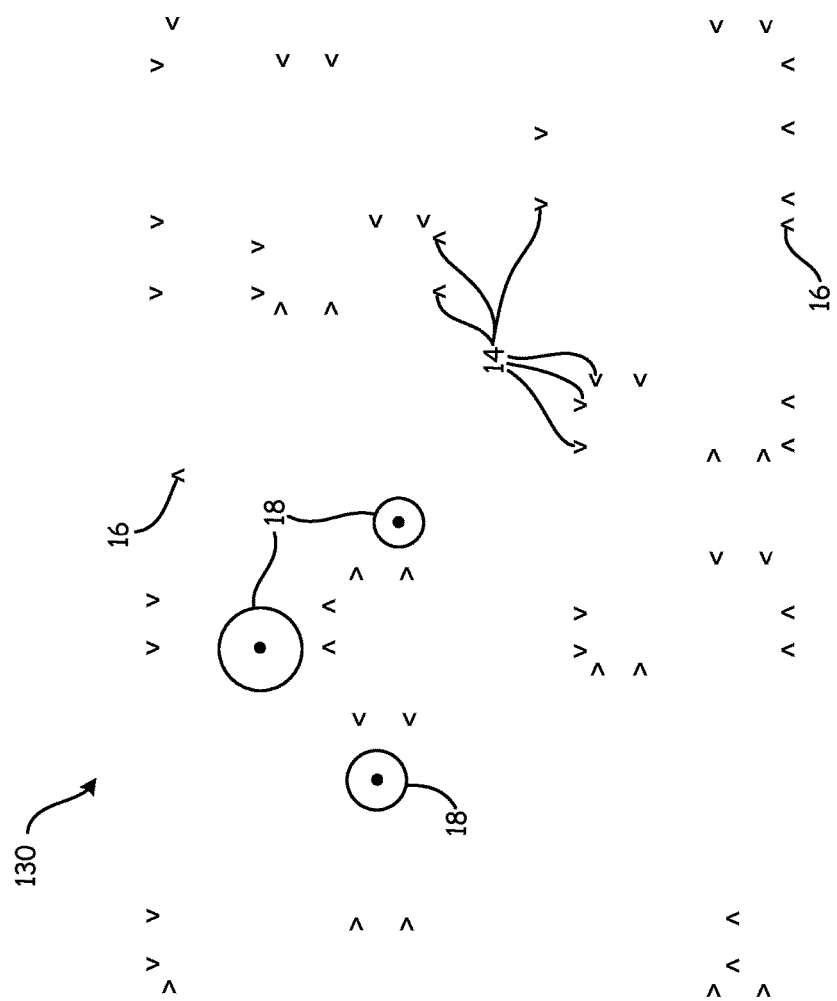
FIG. 9A is a top view of a construction site after construction layout according to an embodiment of the present invention.

FIG. 9A is a top view of laid out construction site 130 after construction layout according to an embodiment of the present invention. Laid out construction site 98 includes orienting arrows 14, control marks 16, and angled wall mark 18. As discussed above, description 20 (shown in FIG. 1B) of defined points DP provides the directional orientation of orienting arrows 14. Orienting arrows 14 are aligned with wall line WL to indicate the direction that wall line WL extends in. Additionally, each pair of orienting arrows 14 that point in a first direction have an associated pair of orienting arrows 14 opposite the first pair of orienting arrows 14. In this way, wall 12 is defined by wall lines WL extending between the first pair of orienting arrows 14 and the second pair of orienting arrows 14. Thus, wall lines WL may be laid out on the construction site by extending a line between the first orienting arrow 16 to the second orienting arrow 16.

Control marks 16 indicate where the end of a prefabricated wall segment should fall on the construction site. Utilizing control marks 16 allows the builder to ensure that walls 12 are being installed at the correct locations. For example, the use of control marks 16 ensure that the building will not overrun its foundation due to excess length inadvertently gained during construction.

Angled wall marks 18 indicate the ends of angled walls. Angled wall mark 18 is preferably a circular mark surrounding a defined point DP with a label 26 that includes "ANGLED." Angled wall mark 18 may be placed on the construction site utilizing compass slot 46 of ruler 33. Wall lines WL extend tangentially between associated angled wall marks 18. While angled wall mark 18 is described as a circular mark, it is understood that angled wall mark 18 may be any suitable mark for indicating the ends of angled walls. It is also understood that while label 26 is described as including "ANGLED" to indicate an angled wall, label 26 may include any other suitable symbol or phrase for indicating that the defined point DP is associated with an angled wall.

Descriptions 20 (shown in FIG. 1B), point marker base 28 (shown in FIG. 2A), and spinning ruler 30 (shown in FIG. 2A) allow efficient and accurate locating of orienting arrows 14, control marks 16, and angled indictor marks 18 on laid out construction site 84. Locating orienting arrows 14 and angled wall marks 18 allows for efficient layout of wall lines WL on laid out construction site 84, by utilizing the directional orientation indicated by orienting arrows 14. While the method of construction layout has been described as being completed by a user, it is to be understood that the several or all of the steps may be completed autonomously.

FIG. 9B is a top view of laid out construction site 230 after construction layout utilizing a prior art method of construction layout. Laid out construction site 230 includes control marks 16 and wall marks 200. Wall marks 200 are located using a scaled floor plan, which gives the user the relative location of all wall marks 200 from a control point located on the site. Multiple users must then locate wall marks 200 utilizing a tape measure, or other measuring device, by measuring scaled distances from the control point to the wall marks 200. Wall lines WL are marked by running lines between associated wall marks 200, but running these lines requires a significant amount of expertise and typically requires at least two people because the user must know the association between two wall marks 200 to ensure that wall line WL is located correctly.

FIG. 9C is a top view of laid out construction site 330 with defined points DP marked. Where the user marks the actual location of defined points DP on the construction site, the markings do not convey the location or orientation of any wall 12 on laid out construction site 330. Defined points DP indicate to the user that the location of defined point DP is either on a wall line WL, if defined point DP is associated with a corridor wall or exterior wall, or that the location of defined point DP is on the centerline of a unit wall. However, without description 20 none of this information is conveyed to the user. Additionally, without description 20, the user is not informed of the thickness T of the wall associated with defined point DP. Without wall marks 200 (shown in FIG. 9B) or orienting arrows 14 (shown in FIG. 9A) there is no indication of the orientation of wall lines WL.

The method of construction layout, with the use of point marker base 28 described herein, provides several advantages. Point marker base 28 provides a base for prism pole 50 to stand on its own. Providing prism pole 50 with a weighted mount 34 allows prism pole 50 to be operated hands-free. Operating prism pole 50 hands-free allows the user to gather readings from electronic surveying equipment without having to set prism pole 50 down, which would cut off the line of sight from the electronic surveying equipment to prism 64, or risking prism pole 50 falling significantly off of level. Prism 64 is mounted near the base of prism pole 50, which ensures that prism 64 remains sufficiently level to gather accurate readings during construction layout. Locating prism 64 near the base of prism pole 50 also ensures that angular variations do not cause the electronic surveying equipment to gather an inaccurate reading of reference point R.

Description 20 provides all necessary information for locating a wall line relative to a defined point. Wall designation 22 informs of the type of wall that a defined point is associated with. Wall lines are thus easily located because the location of the defined point relative to the wall line is known based upon the wall type. Unit number 24 allows quick identification of the walls associated with any particular area of the construction project, which permits quick identification and location for any walls that may need priority marking. Label 26 provides all of the remaining information that may be needed to locate wall lines on the site, including the directional orientation or wall lines and the thickness of the various walls.

In addition to supporting prism pole 50, point marker base 28 allows wall lines WL to be marked during construction layout without resetting prism pole 50 to establish a new reference point R. Once the electronic surveying equipment provides the offset distances from reference point R to defined point DP, a first offset distance is measured with ruler 33. Description 20 of defined point DP provides the orientation of wall 12 associated with defined point DP. The distances to the first wall line and the second wall line are known based on the description 20. The first wall line and the second wall line may be located using slider 70 and wall line indicators 78. Wall lines may thus be located in a relatively simple and time-efficient manner. Additionally, if defined points DP fall outside the reach of ruler 33, an additional measuring device may be attached to extension slot 48 to allow continuous locating of wall lines utilizing the same reference point R. Where the defined point DP is beyond the reach of slider 70, the distance to the first wall line may be measured along the ruler or additional measuring device, based on description 20, and the distance to the second wall line may also be measured along the ruler or additional measuring device, also based on description 20.

According to one embodiment of the present invention, an apparatus for marking points during construction layout comprises a point marker base, a measuring instrument, and a prism assembly. The measuring instrument is rotatably secured to the point marker base, and the prism assembly is mounted vertically on the point marker base.

According to another embodiment of the present invention, a method for marking points during construction layout comprises defining points in a floor plan, uploading the defined points and the floor plan to an electronic surveying instrument, and selecting a specific defined point to be located from the defined points in the floor plan. A prism pole is attached to a point marker base, and the prism pole and point marker base are located at a desired reference point. A first offset distance is determined in a first direction from the reference point to the specified defined point and wall lines are located with reference to the description provided for the specified defined point. The location and orientation of the wall lines is marked on the site according to the description provided.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of construction layout, the method comprising:
   generating a plurality of defined points in a floor plan, wherein each one of the plurality of defined points includes a description indicating a directional orientation of wall lines associated with the defined point and a thickness of a wall associated with the defined point;
   uploading the plurality of defined points to an electronic surveying instrument;
   selecting a first defined point of the plurality of defined points to be located;
   positioning a detail locating apparatus at a location on a construction site to thereby establish a reference point, wherein the detail locating apparatus comprises:
      a marker base;
      a prism assembly extending vertically from the marker base; and
      a measuring instrument extending horizontally from the marker base;
   receiving an offset distance between the first defined point and the reference point from the electronic surveying instrument; and
   locating, with the measuring instrument, wall lines associated with the first defined point based on the offset distance between the first defined point and the reference point and based on the content and format of the description associated with the first defined point.

2. The method of claim 1, and further comprising:
marking orienting arrows for the wall lines, each orienting arrow indicating a direction in which a respective wall line extends.

3. The method of claim 1, wherein the step of generating the plurality of defined points in the floor plan further comprises:
locating points at selected locations within the floor plan, the selected locations including at least one of an end of a wall, an intersection of a plurality of walls, and a control point; and
labeling each one of the plurality of defined points with the description.

4. The method of claim 3, wherein the description includes at least one of a wall designation, a unit number, and a label.

5. The method of claim 4, wherein the wall designation indicates that a wall is a corridor wall, an exterior wall, or a unit wall.

6. The method of claim 1, wherein the step of generating the plurality of defined points in the floor plan further comprises:
surveying a building footprint;
generating, with a processor of a computer, a floor plan;
storing the floor plan and building footprint in a memory of the computer;
determining, with the processor of the computer, a best fit of the floor plan on the building footprint;
locating seed points at selected locations within the floor plan using a user interface of the computer; and
locating each one of the plurality of defined points, with the processor of the computer, at selected locations within the floor plan, the selected locations including at least one of an end of a wall, an intersection of a plurality of walls, and a control point.

7. The method of claim 1, wherein the step of generating the plurality of defined points in the floor plan comprises:
surveying a foundation, wherein surveying the foundation includes locating relevant points on the foundation including corners of the foundation;
orienting the floor plan on the foundation; and
converting the floor plan to points, the points including at least one of backsight points and defined points.

8. The method of claim 7, wherein the step of orienting the floor plan on the foundation further includes minimizing an error around the foundation between the floor plan and the foundation.

9. The method of claim 7, wherein the defined points include at least one of a defined point for a unit wall, a defined point for a corridor wall, and a defined point for an exterior wall.

10. The method of claim 9, wherein the defined point for a unit wall is located on a midline of the unit wall.

11. The method of claim 9, wherein the defined point for a corridor wall is located on a midline of the corridor wall.

12. The method of claim 9, wherein the defined point for an exterior wall is located on an interior wall line of the exterior wall.

13. The method of claim 1, wherein the step of locating the detail locating apparatus at the location on the construction site to thereby establish the reference point further comprises:
positioning the marker base at a desired location;
locating the prism assembly with the electronic surveying instrument to thereby determine a relative location of the detail locating apparatus on the construction site; and
accepting the location of the marker base as the reference point.

14. A method of converting a floor plan for construction layout and locating wall lines on a construction site, the method comprising:
generating, with a processor of a computer, a best fit of a floor plan on a building footprint, and storing the floor plan and building footprint in a memory of the computer;
locating seed points at selected locations within the floor plan using a user interface of the computer;
locating a plurality of defined points, with the processor of the computer, at selected locations within the floor plan, the selected locations including at least one of an end of a wall, an intersection of a plurality of walls, and a control point;
defining a first defined point of the plurality of defined points with a first description, wherein the first description includes at least one of a wall designation, a unit number, and a label;
associating, by the processor, the first defined point with the first description to thereby generate a first annotated defined point, and storing the first annotated defined point in the memory;
providing the first annotated defined point to an electronic surveying instrument, the electronic surveying instrument configured to determine an offset distance between the first annotated defined point and a detail locating apparatus on a construction site, wherein the detail locating apparatus comprises:
a marker base;
a prism assembly extending vertically from the marker base; and
a measuring instrument extending horizontally from the marker base;
determining, on the construction site, the locations of wall lines associated with the first annotated defined point based on the offset distance, and determining the orientations of the wall lines based on the first description; and
locating, with the measuring instrument, the wall lines associated with the first annotated defined point.

15. The method of claim 14, and further comprising:
defining a second defined point of the plurality of defined points with a second description, wherein the second description includes at least one of a wall designation, a unit number, and a label.

16. The method of claim 14, wherein the wall designation indicates that a wall is a corridor wall, an exterior wall, or a unit wall.

17. The method of claim 14, wherein the label includes at least one of a directional orientation of the wall lines, a thickness of the wall, and a point descriptor.

18. The method of claim 14, wherein the step of generating the best fit of the floor plan on the building footprint includes locating backsight points on the floor plan.

19. The method of claim 14, wherein the seed points are configured to identify a subset of a plurality of walls as one of exterior walls and corridor walls.

20. The method of claim 19, wherein the seed points define at least one unit on the floor plan.

21. The method of claim 20, further comprising:
identifying, with the processor of the computer, a plurality of unit walls based on the seed points.

22. The method of claim 21, further comprising:
determining, by the processor, a unit wall width of the each of the plurality of unit walls, an exterior wall width of an exterior wall, and a corridor wall width of a corridor wall.

23. The method of claim 14, further comprising:
identifying, by the user interface, a perimeter of the building footprint.

24. The method of claim 14, wherein the step of generating the best fit of the floor plan on the building footprint includes establishing a relative north for the floor plan.

25. The method of claim 15, further comprising:
associating, by the processor, the second defined point with the second description to thereby generate a second annotated defined point, and storing the second annotated defined point in the memory.

\* \* \* \* \*